US008850333B2

United States Patent
Song et al.

(10) Patent No.: US 8,850,333 B2
(45) Date of Patent: Sep. 30, 2014

(54) MOBILE TERMINAL AND DISPLAY CONTROLLING METHOD THEREOF

(75) Inventors: Yoo Mee Song, Seoul (KR); Byung Sang Yeo, Gyeonggi-do (KR); Seong Yoon Cho, Seoul (KR); Yee Rang Yun, Seoul (KR); Hye Youn Cho, Seoul (KR); Dong Seok Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 689 days.

(21) Appl. No.: 12/768,647

(22) Filed: Apr. 27, 2010

(65) Prior Publication Data
US 2011/0061006 A1 Mar. 10, 2011

(30) Foreign Application Priority Data

Sep. 9, 2009 (KR) .................. 10-2009-0084851

(51) Int. Cl.
*G06F 3/00* (2006.01)
*H04M 1/725* (2006.01)
*H04W 8/18* (2009.01)
*H04M 1/2745* (2006.01)

(52) U.S. Cl.
CPC .......... *H04W 8/183* (2013.01); *H04M 2250/02* (2013.01); *H04M 1/274533* (2013.01); *H04M 1/72561* (2013.01); *H04M 1/27455* (2013.01); *H04M 2250/22* (2013.01); *H04M 1/72583* (2013.01); *H04M 1/72552* (2013.01); *H04M 1/274508* (2013.01); *H04M 1/7253* (2013.01)

USPC .......................................... 715/760

(58) Field of Classification Search
USPC .......................................... 715/760
See application file for complete search history.

(56) References Cited

U.S. PATENT DOCUMENTS

| 5,544,354 | A | * | 8/1996 | May et al. .......................... 1/1 |
| 5,551,021 | A | * | 8/1996 | Harada et al. ................. 382/305 |
| 6,404,884 | B1 | * | 6/2002 | Marwell et al. .......... 379/265.13 |
| 6,724,370 | B2 | * | 4/2004 | Dutta et al. .................... 345/169 |
| 8,090,776 | B2 | * | 1/2012 | Torres et al. .................. 709/206 |
| 2006/0282819 | A1 | * | 12/2006 | Graham et al. ............... 717/113 |
| 2007/0198474 | A1 | * | 8/2007 | Davidson et al. ................ 707/3 |
| 2010/0199340 | A1 | * | 8/2010 | Jonas et al. ....................... 726/8 |
| 2010/0299615 | A1 | * | 11/2010 | Miluzzo et al. ............... 715/752 |
| 2011/0035673 | A1 | * | 2/2011 | Chou et al. .................... 715/739 |

* cited by examiner

*Primary Examiner* — Boris Pesin
*Assistant Examiner* — Matthew Ell
(74) *Attorney, Agent, or Firm* — Lee, Hong, Degerman, Kang & Waimey

(57) ABSTRACT

A mobile terminal and display controlling method thereof are disclosed. The present invention includes storing user registration information registered at each of one or more websites, receiving an input of a command signal for providing the user registration information, and displaying a registration information indicator corresponding to each of the one or more websites. Displaying the registration information indicator includes displaying the stored user registration information registered at the corresponding website within the registration information indicator.

20 Claims, 49 Drawing Sheets

MOBILE TERMINAL AND DISPLAY CONTROLLING METHOD THEREOF

Pursuant to 35 U.S.C. §119(a), this application claims the benefit of earlier filing date and right of priority to Korean Application No. 10-2009-0084851, filed on Sep. 9, 2009, the contents of which are hereby incorporated by reference herein in their entirety.

FIELD OF THE INVENTION

The present invention relates to a mobile terminal, and more particularly, to a mobile terminal and display controlling method thereof. Although the present invention is suitable for a wide scope of applications, it is particularly suitable for enabling a user to be provided with and to edit user registration information for websites.

DISCUSSION OF THE RELATED ART

Generally, terminals can be classified into mobile/portable terminals and stationary terminals. The mobile terminals can be classified into handheld terminals and vehicle mounted terminals according to the user's direct portability. As functions of the mobile terminal are diversified, the mobile terminals are implemented as multimedia players provided with composite functions such as capturing photos or moving pictures, playback of music or moving picture files, game playing, and broadcast reception.

According to a related art, a mobile terminal in which terminal registration information (e.g., phone number, email address, birthday, photo information) is stored, is able to display the stored terminal registration information if a menu item of terminal information view is executed through a menu search. Moreover, if a website address directly input by a user exists as terminal registration information, the mobile terminal is able to store and manage the input website address as the terminal registration information.

However, it is inconvenient to search menus one by one for the terminal registration information. Moreover, the website address is simply managed as only the terminal registration information. A method of managing registration information registered at a specific website by a terminal user has not been provided.

SUMMARY OF THE INVENTION

Accordingly, the present invention is directed to a mobile terminal and display controlling method thereof that substantially obviates one or more problems due to limitations and disadvantages of the related art.

An object of the present invention is to provide a mobile terminal and display controlling method thereof, by which a plurality of user registration information can be displayed on one screen.

Another object of the present invention is to provide a mobile terminal and display controlling method thereof, by which user registration information registered at a specific website can be conveniently edited.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a mobile terminal according to the present invention includes a user input unit configured to receive a command signal for providing user registration information, a memory configured to store user registration information registered at each of one or more websites, a display configured to display information, and a controller configured to control the display to display a registration information indicator corresponding to each of the one or more websites when the command signal for providing the user registration information is received. The controller is further configured to control the display to display the stored user registration information registered at each of the one or more websites within the corresponding registration information indicator.

In another aspect of the present invention, a method of controlling a display in mobile terminal includes storing user registration information registered at each of one or more websites in a memory, receiving a command signal via a user input unit for providing the user registration information, and displaying a registration information indicator corresponding to each of the one or more websites on a display when the command signal is received. Displaying the registration information indicator further includes displaying the stored user registration information registered at the corresponding website within the registration information indicator.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the present invention, examples of which are illustrated in the accompanying drawings. Wherever possible, the same reference numbers will be used throughout the drawings to refer to the same or like parts. As used herein, the suffixes 'module' and 'unit' are used for elements in order to facilitate the disclosure only. Therefore, significant meanings or roles are not given to the suffixes themselves and it is understood that the 'module' and 'unit' can be used together or interchangeably.

Mobile terminals described herein can include a mobile phone, a smart phone, a laptop computer, a digital broadcast terminal, a PDA (personal digital assistants), a PMP (portable multimedia player), a navigation system and the like. Except a case applicable to a mobile terminal only, it is apparent to those of ordinary skill in the art that the configurations described herein are also applicable to stationary terminals, such as digital TVs and desktop computers.

Figure 1:
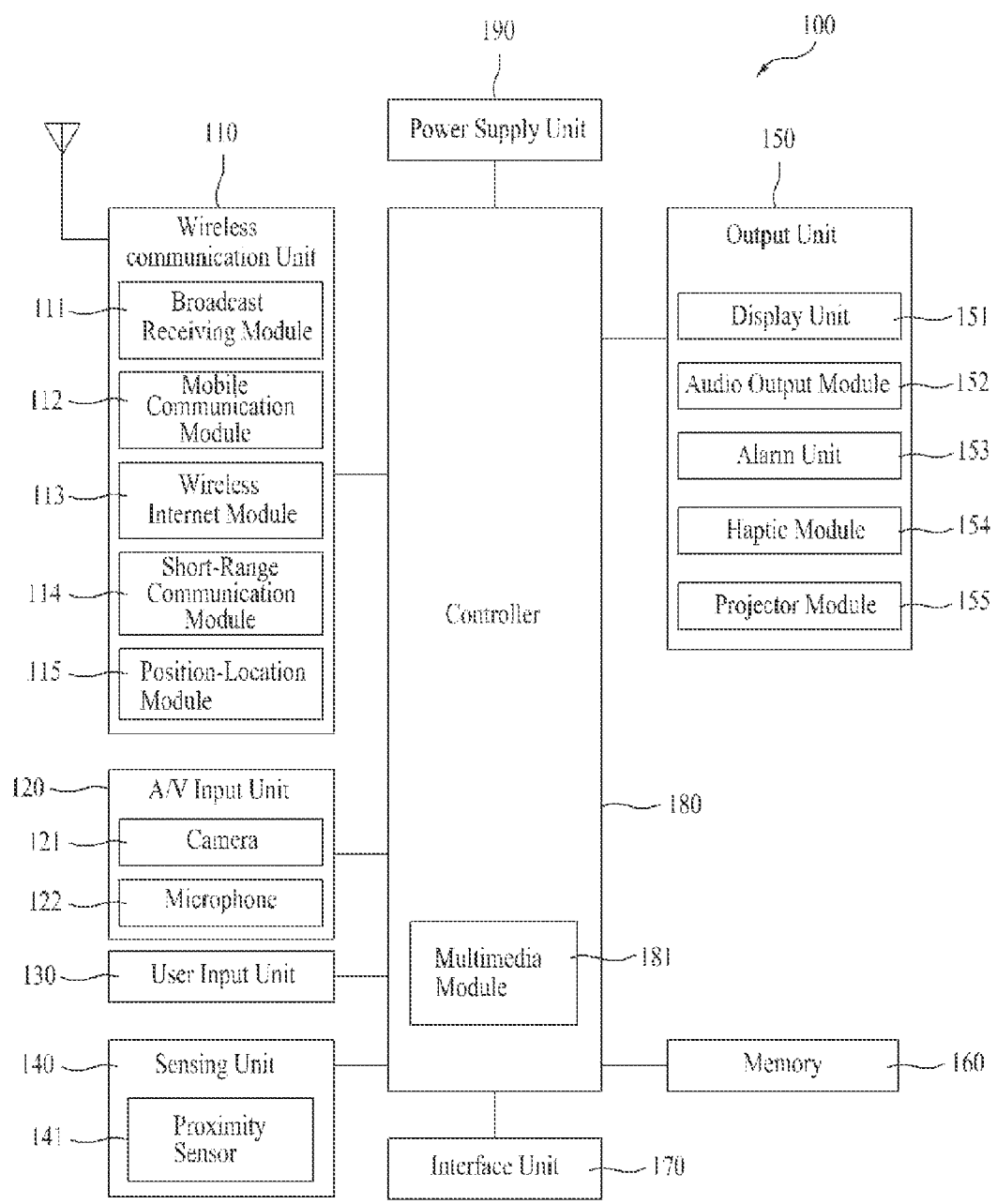
FIG. 1 is a block diagram of a mobile terminal according to one embodiment of the present invention.

FIG. 1 is a block diagram of a mobile terminal 100 according to one embodiment of the present invention. Referring to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180 and a power supply unit 190. Although FIG. 1 shows the mobile terminal 100 having various components, it is understood that implementing all of the illustrated components is not a requirement. More or fewer components may alternatively be implemented.

The wireless communication unit 110 may include one or more components that permit wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and/or a terrestrial channel. The broadcast signal and/or broadcast associated information received by the broadcast receiving module 111 may be stored in a suitable storage device, such as in the memory 160.

The external broadcast managing server generally refers to a server that generates and transmits a broadcast signal and/or broadcast associated information or a server that is provided with a previously generated broadcast signal and/or broadcast associated information and then transmits the provided signal or information to the mobile terminal 100.

The broadcast signal may be implemented as a TV broadcast signal, a radio broadcast signal, a data broadcast signal, or other known type of signal. If desired, the broadcast signal may include a broadcast signal combined with a TV or radio broadcast signal.

The broadcast associated information includes information associated with a broadcast channel, a broadcast program, or a broadcast service provider. The broadcast associated information can be provided via a mobile communication network, in which case the broadcast associated information can be received by the mobile communication module 112.

The broadcast associated information can be implemented in various forms. For example, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. For example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-explained digital broadcasting systems.

The mobile communication module 112 transmits/receives wireless signals to/from one or more network entities (e.g., base station, external terminal, server). Such wireless signals may represent, for example, audio, video, and data according to text/multimedia message transceivings.

The wireless Internet module 113 supports Internet access for the mobile terminal 100. The wireless Internet module 113 may be internally or externally coupled to the mobile terminal 100. The wireless Internet technology can include WLAN (Wireless LAN), Wi-Fi, Wibro (Wireless broadband), Wimax (World Interoperability for Microwave Access), HSDPA (High Speed Downlink Packet Access), or other types of known wireless Internet technology.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth™ and ZigBee®.

The position-location module 115 identifies or otherwise obtains the location of the mobile terminal 100. If desired, the position location module 115 may be implemented with a global positioning system (GPS) module.

With continued reference to FIG. 1, the audio/video (A/V) input unit 120 may be configured to provide audio or video signal input to the mobile terminal 100. As shown, the A/V input unit 120 includes a camera 121 and a microphone 122.

The camera 121 receives and processes image frames of still pictures or video, which are obtained by an image sensor in a video call mode or a photographing mode. The processed image frames can be displayed on a display unit 151. The image frames processed by the camera 121 can be stored in the memory 160 or can be externally transmitted via the wireless communication unit 110. Optionally, at least two cameras 121 can be provided in the mobile terminal 100 according to an environment of use.

The microphone 122 receives an external audio signal while the mobile terminal 100 is in a particular mode, such as phone call mode, recording mode or voice recognition mode. The external audio signal is processed and converted into electric audio data. The processed audio data is transformed into a format transmittable to a mobile communication base station via the mobile communication module 112 when in a call mode. The microphone 122 typically includes assorted noise removing algorithms to remove noise generated in the course of receiving the external audio signal.

The user input unit 130 generates input data in response to user manipulation of an associated input device or devices. Examples of such input devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. The sensing unit 140 may include a proximity sensor 141. For example, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation of the mobile terminal 100 or acceleration/deceleration of the mobile terminal 100.

As an example, the mobile terminal 100 may be configured as a slide-type mobile terminal. In this configuration, the sensing unit 140 may sense whether a sliding portion of the mobile terminal is open or closed. Other examples include the sensing unit 140 sensing the presence or absence of power provided by the power supply 190 and the presence or absence of a coupling or other connection between the interface unit 170 and an external device.

The output unit 150 generates outputs relevant to the senses of sight, hearing, and touch. The output unit 150 may include the display unit 151, an audio output module 152, an alarm unit 153, a haptic module 154, and a projector module 155.

The display unit 151 is typically implemented to visually display (output) information associated with the mobile terminal 100. For example, if the mobile terminal 100 is operating in a phone call mode, the display 151 will generally provide a user interface (UI) or graphical user interface (GUI) that includes information associated with placing, conducting, and terminating a phone call. As another example, if the mobile terminal 100 is in a video call mode or a photographing mode, the display unit 151 may additionally or alternatively display images that are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented as a transparent or optical transmittive type, hereafter referred to as a transparent display. A TOLED (transparent OLED) is a representative example of the transparent display.

A rear configuration of the display unit 151 can also be implemented in the optical transmittive type. In this configuration, a user is able to see an object at the rear of the terminal body via the area occupied by the display unit 151 of the terminal body.

At least two display units 151 can be provided in the mobile terminal 100. For example, a plurality of display units 151 can be arranged on a single face of the mobile terminal 100 spaced apart from each other or built in one body. Alternatively, a plurality of display units 151 can be arranged on different faces of the mobile terminal 100.

If the display unit 151 and a sensor for detecting a touch action (hereinafter called 'touch sensor') configures a mutual layer structure (hereinafter called 'touchscreen'), the display unit 151 may be used as both an input device and an output device. In this case, the touch sensor can be configured as a touch film, a touch sheet, or a touchpad.

The touch sensor can be configured to convert a pressure applied to a specific portion of the display unit 151 or a variation of a capacitance generated from a specific portion of the display unit 151 to an electric input signal. Moreover, the touch sensor is able to detect a pressure of a touch as well as a touched position or magnitude of the touch.

If a touch input is made to the touch sensor, signal(s) corresponding to the touch is transferred to a touch controller. The touch controller processes the signal(s) and then transfers the processed signal(s) to the controller 180. Therefore, the controller 180 is able to determine whether a prescribed portion of the display unit 151 is touched.

Referring again to FIG. 1, a proximity sensor 141 can be provided to an internal area of the mobile terminal 100 enclosed by the touchscreen or around the touchscreen. The proximity sensor 141 is a sensor that detects a presence or non-presence of an object approaching a prescribed detecting surface or an object existing around the proximity sensor using an electromagnetic field strength or infrared ray without mechanical contact. Hence, the proximity sensor 141 has greater durability than a contact type sensor and also has greater utility than the contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, or other type of known proximity sensor. If the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action in which a pointer approaches without contacting the touchscreen, yet is recognized as being located on the touchscreen, is named 'proximity touch'. An action in which a pointer actually touches the touchscreen is named 'contact touch'. The position on the touchscreen proximity-touched by the pointer refers to the position of the pointer that vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

Figure 2:
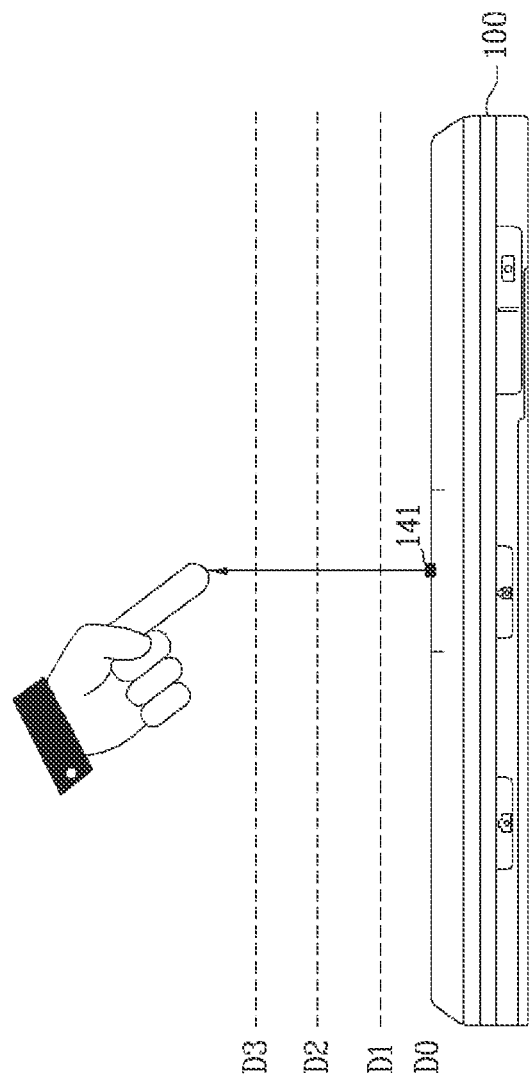
FIG. 2 is a diagram to explain the concept of proximity depth of a proximity sensor.

FIG. 2 is a conceptual diagram for explaining a proximity depth of the proximity sensor 141. Referring to FIG. 2, when a pointer, such as a user's finger or a pen, for example, approaches the touchscreen, the proximity sensor 141 provided within or in the vicinity of the touchscreen detects the approach of the pointer and outputs a proximity signal in response. The proximity sensor 141 can be configured to output a different proximity signal according to a distance between the pointer and the proximity-touched touchscreen (hereinafter named 'proximity depth').

In FIG. 2, a cross-section of the touchscreen is shown provided with a proximity sensor 141 capable of detecting three proximity depths. It is understood that a proximity sensor capable of detecting more or fewer proximity depths is possible.

If the pointer fully contacts the touchscreen (D0), it is recognized as a contact touch. If the pointer is positioned a distance from the touchscreen that is smaller than D1, it is recognized as a proximity touch to a first proximity depth. If the pointer is positioned a distance from the touchscreen equal to or greater than D1 and less than D2, it is recognized as a proximity touch to a second proximity depth. If the pointer is positioned a distance from the touchscreen smaller than D3 and equal to or greater than D2, it is recognized as a proximity touch to a third proximity depth. If the pointer is positioned a distance from the touchscreen equal to or greater than D3, no proximity touch is recognized.

The controller 180 recognizes the proximity touch as one of various input signals according to the proximity depth and position of the pointer. The controller 180 performs various operation controls according to the various input signals.

Referring again to FIG. 1, the audio output module 152 functions in various modes including a call-receiving mode, a call-placing mode, a recording mode, a voice recognition mode, or a broadcast reception mode to output audio data that is received from the wireless communication unit 110 or is stored in the memory 160. During operation, the audio output module 152 outputs audio relating to a particular function (e.g., call received, message received). The audio output module 152 is often implemented using one or more speakers, buzzers, other audio producing devices, and combinations thereof.

The alarm unit 153 outputs a signal for announcing the occurrence of a particular event associated with the mobile terminal 100. Typical events include a call received event, a message received event and a touch input received event. The alarm unit 153 is able to output a signal for announcing the event occurrence via vibration as well as a video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative tactile effect generated by the haptic module 154. Strength and pattern of the vibration generated by the haptic module 154 are controllable. For example, different vibrations can be output by being synthesized together or can be output in sequence.

The haptic module 154 may generate various tactile effects in addition to vibration. For example, the haptic module 154 may generate an effect attributed to the arrangement of pins vertically moving against a contact skin surface, an effect attributed to injection/suction power of air though an injection/suction hole, an effect attributed to the skimming over a skin surface, an effect attributed to contact with an electrode, an effect attributed to an electrostatic force, an effect attributed to a representation of hot/cold sense using an endothermic or exothermic device, or other known tactile effects.

The haptic module 154 can be implemented to enable a user to sense the tactile effect through a muscle sense of finger or arm as well as to transfer the tactile effect through a direct contact. Optionally, at least two haptic modules 154 can be provided in the mobile terminal 100 in accordance with the corresponding configuration type of the mobile terminal 100.

The projector module 155 is an element for performing an image projector function using the mobile terminal 100. The projector module 155 displays an image, which is identical to or partially different from an image displayed on the display unit 151, on an external screen or wall according to a control signal of the controller 180.

The projector module 155 can include a light source (not shown) generating light (e.g., laser) for projecting an image externally, an image producing means (not shown) for producing an image to output externally using the light generated from the light source, and a lens (not shown) for enlarging the image output externally at a predetermined focus distance. The projector module 155 can further include a device for adjusting a direction of the projected image by mechanically moving the lens or the entire projector module.

The projector module 155 can be classified as a CRT (cathode ray tube) module, an LCD (liquid crystal display) module, a DLP (digital light processing) module or other type of known projector module according to a type of the display means. In particular, the DLP module is operated by a mechanism for enabling the light generated from the light source to reflect on a DMD (digital micro-mirror device) chip and can be advantageous for limiting the size of the projector module 151.

Preferably, the projector module 155 can be provided in a lengthwise direction of a lateral side, front side or back side of the mobile terminal 100. It is understood that the projector module 155 can be provided on any portion of the mobile terminal 100 according to necessity.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, and moving pictures.

A recent use history or a cumulative use frequency of each data (e.g., use frequency for each phonebook, each message or each multimedia) can be stored in the memory unit 160. Moreover, data for various patterns of vibration and/or sound output in response to a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory), or other similar memory or data storage device. The mobile terminal 100 may operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or other known port types.

The identity module is the chip for storing various types of information for authenticating a use authority of the mobile terminal 100 and can include User Identify Module (UIM), Subscriber Identify Module (SIM) and/or Universal Subscriber Identity Module (USIM). A device having the identity module (hereinafter called an 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications and video calls. The controller 180 may include a multimedia module 181 that provides multimedia playback. The multimedia module 181 may be configured as part of the controller 180 or implemented as a separate component. The controller 180 may also perform a pattern recognizing process for recognizing a writing input and a picture drawing input performed on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

Figure 3A:
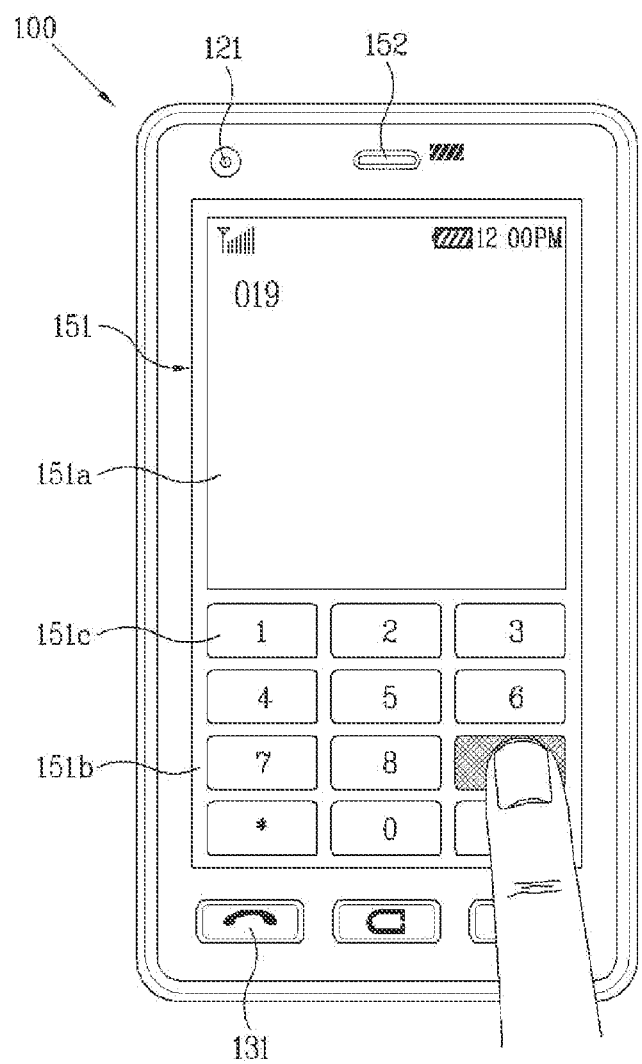
FIG. 3A is a front perspective diagram of a mobile terminal according to one embodiment of the present invention.
Figure 3B:
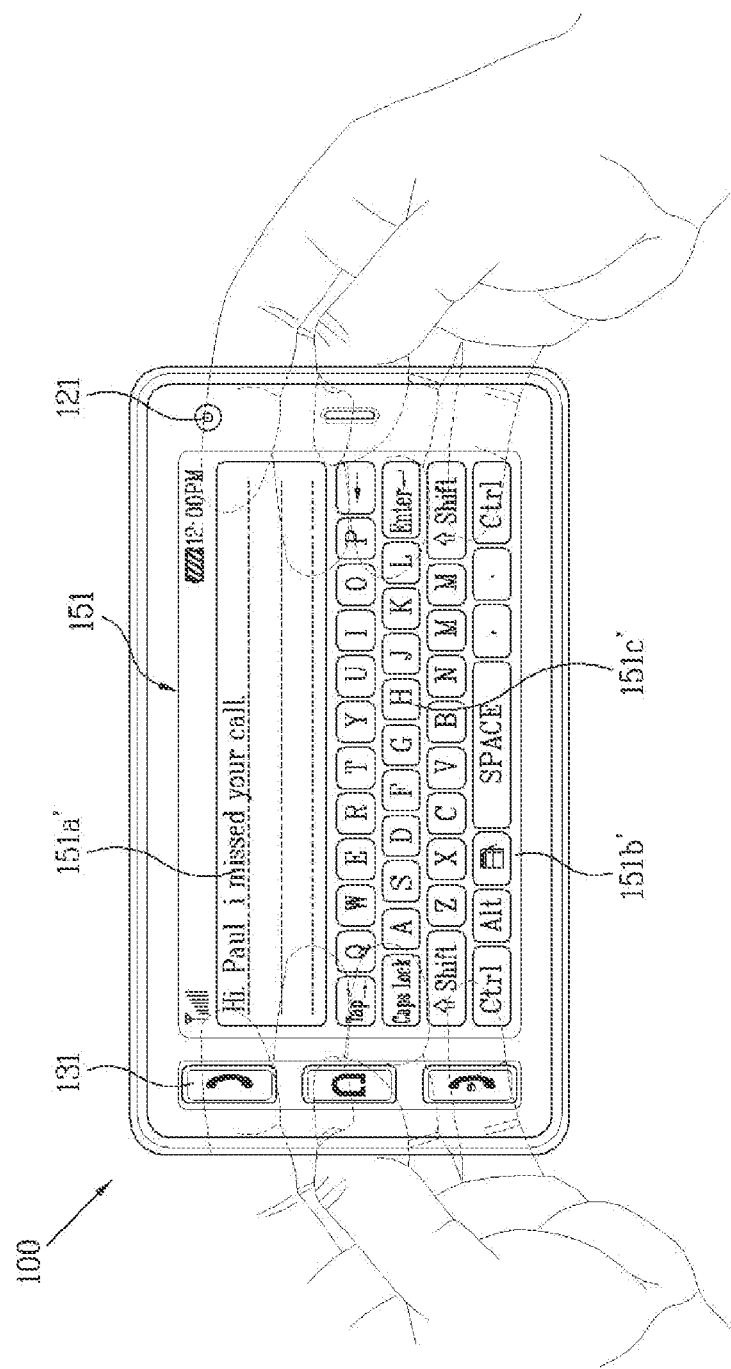
FIG. 3B is a rear perspective diagram of a mobile terminal according to one embodiment of the present invention.

Interconnected operational mechanism between the display unit 151 and a touchpad are explained with reference to FIGS. 3A and 3B. FIGS. 3A and 3B are front-view diagrams of a terminal according to one embodiment of the present invention for explaining an operational state thereof.

Various types of visual information can be displayed on the display unit 151. The information can be displayed as characters, numerals, symbols, graphics and/or icons.

In order to input the information, at least one of the characters, numerals, symbols, graphics and icons is represented as a single predetermined array to be implemented in a keypad formation. This keypad formation can be so-called 'soft keys'. FIG. 3A depicts a touch applied to a soft key input through a front face of a terminal body.

The display unit 151 is operable through an entire area or by being divided into a plurality of regions. In the latter case, a plurality of the regions can be configured to be interoperable.

For example, an output window 151a and an input window 151b are displayed on the display unit 151. A soft key 151c representing a digit for inputting a phone number or other information is displayed on the input window 151b. If the soft key 151c is touched, a digit corresponding to the touched soft key is displayed on the output window 151a. If a first manipulating unit 131 is manipulated, a call connection for the phone number displayed on the output window 151a is attempted.

FIG. 3B depicts a touch being applied to a soft key input through a rear face of a terminal body. FIG. 3A shows the terminal body arranged vertically (portrait), while FIG. 3B shows the terminal body arranged horizontally (landscape). The display unit 151 can be configured to change an output picture according to the arranged direction of the terminal body.

FIG. 3B shows a text input mode activated in the mobile terminal 100. An output window 151a' and an input window 151b' are displayed on the display unit 151. A plurality of soft keys 151c' representing at least characters, symbols or digits can be arranged in the input window 151b'. The soft keys 151c' can be arranged in the QWERTY key formation.

If the soft keys 151c' are touched through the touchpad, the characters, symbols and digits corresponding to the touched soft keys are displayed on the output window 151a'. The touch input via the touchpad is advantageous since blocking the soft keys 151c' by a finger during a touch can be prevented, as compared to the touch input via the display unit 151. If the display unit 151 and the touchpad are configured as transparent, the user is able to visually see his/her fingers located at the back side of the terminal body. Hence, more accurate touch inputs are possible.

The display unit 151 or the touchpad can be configured to receive a touch input by scroll. A user scrolls the display unit 151 or the touchpad to shift a cursor or pointer located at an entity (e.g., an icon) displayed on the display unit 151. Furthermore, when a finger is shifted on the display unit 151 or the touchpad, a path of the shifted finger can be displayed visually on the display unit 151. This may be useful in editing an image displayed on the display unit 151.

When both the display unit (touchscreen) 151 and the touchpad are touched together within a predetermined time range, one function of the mobile terminal 100 can be executed. The simultaneous touch may occur when the terminal body is held by a user using a thumb and a first finger (clamping). The above function can include activation or deactivation for the display unit 151 or the touchpad.

"User information," as used herein, can refer to user information registered at a website (hereinafter, "web user information") or user information registered at a mobile terminal (hereinafter, "terminal user information"). For example, the web user information can include an identification (ID), a password, an address, a wireless phone number, a wire phone number, an email, a date of birth and/or a user image. The terminal user information can include an information item, such as a corresponding terminal phone number, a wire phone number, an email, a date of birth and/or a user image.

Figure 4:
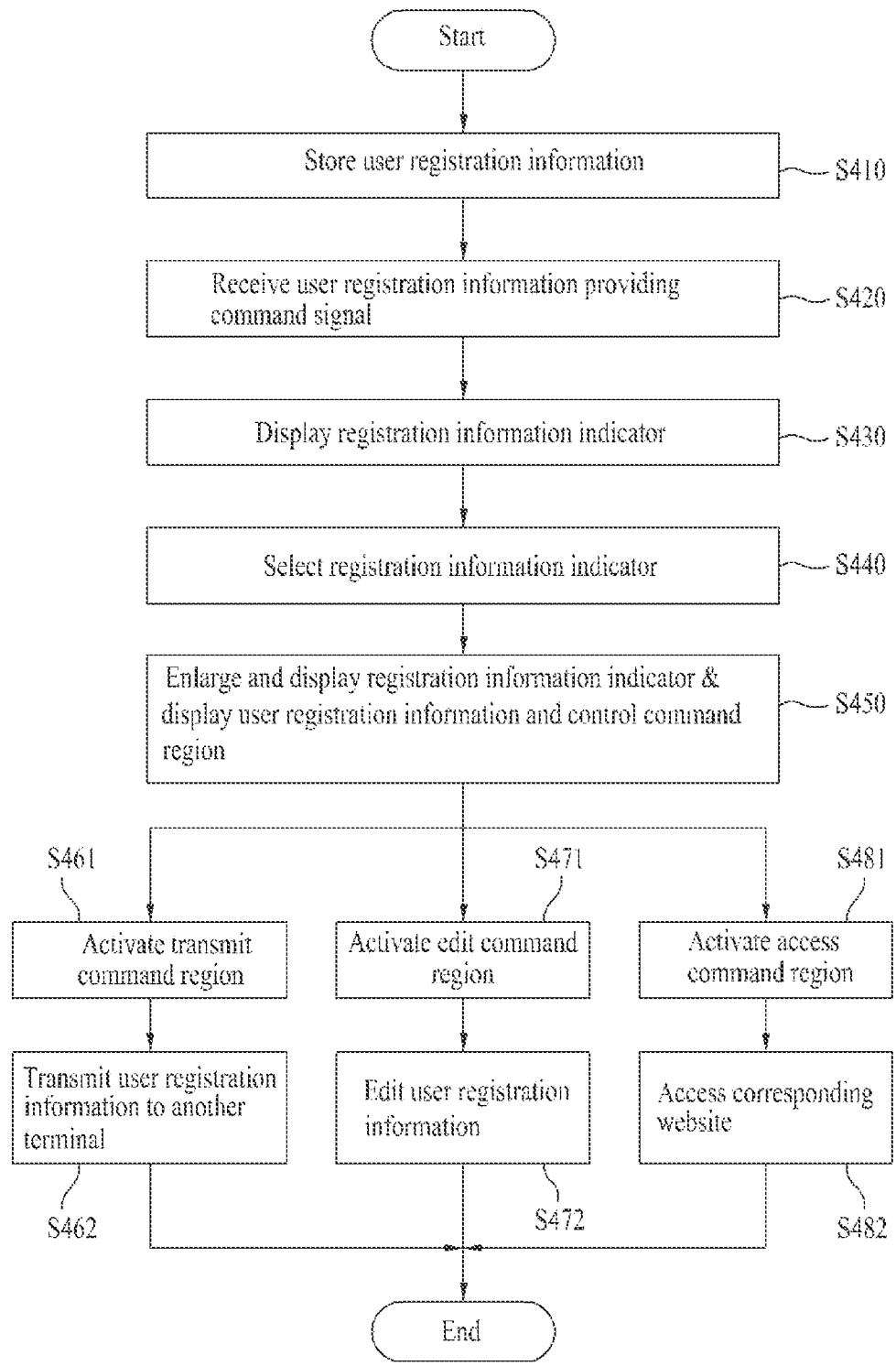
FIG. 4 is a flowchart for a method of controlling a display in a mobile terminal according to one embodiment of the present invention.

A method of controlling a display in a mobile terminal is explained in detail with reference to the accompanying drawings. FIG. 4 is a flowchart for a method of controlling a display in a mobile terminal. Referring to FIG. 4, the mobile terminal 100 stores user registration information in the memory 160 under the control of the controller 180 [S410].

The mobile terminal 100 is able to store terminal user information from initial registration at the time of purchase or terminal user information directly input into the mobile terminal 100 by a terminal user. The terminal user information can be managed by a terminal management server as well as the mobile terminal 100. Moreover, a user is able to randomly update the stored terminal user information.

In the following description, the storage of web user information is explained. When a terminal user subscribes to a specific website using the mobile terminal 100 or another terminal, the specific website is able to transmit web user information registered when subscribing to the specific website to the mobile terminal 100 either randomly or according to user selected parameters. The mobile terminal 100 receives the web user information registered at the specific website via the wireless communication unit 110, specifically the wireless Internet module 113, and stores the received web user information in the memory 160.

When a terminal user subscribes to a specific website using the mobile terminal 100, the mobile terminal 100 is aware of the web user information registered during the process and automatically stores the web user information. When access to a specific website is ended, the specific website transmits web user information to the mobile terminal 100 either randomly or according to user selected parameters. If the web user information is updated, the specific website updates the web user information previously stored in the memory 160 with reference to the web user information received via the wireless communication unit 110.

The mobile terminal 100 transmits a transmission request signal for web user information to a specific website via the wireless communication unit 110 periodically or at a random timing point, receives the web user information from the specific website in response to the transmission request signal, and stores the received web user information. If the previously stored web user information differs from the received web user information, the mobile terminal 100 updates the previously stored web user information with reference to the received web user information.

The mobile terminal 100 receives an input of web user information registered at a specific website directly from a user via the user input unit 130 and stores the input web user information in the memory 160. Meanwhile, the mobile terminal 100 receives a command signal for providing user registration information via the user input unit 130. The command signal for providing user registration information can include a signal for commanding a display of a registration information indicator containing at least one web user information or a registration information indicator containing terminal user information.

The command signal for providing user registration information can be input when a menu item, key or key region, which corresponds to the provided user registration information, is selected by a user. For instance, the key region can include an icon region for receiving a touch input of the command signal for providing user registration information or a widget region.

The mobile terminal 100 may display a user widget for receiving the command signal for providing user registration information on a screen. The mobile terminal 100 is then able to receive an input of the command signal for providing user registration information if the displayed user widget is touched by a user.

Figure 5:
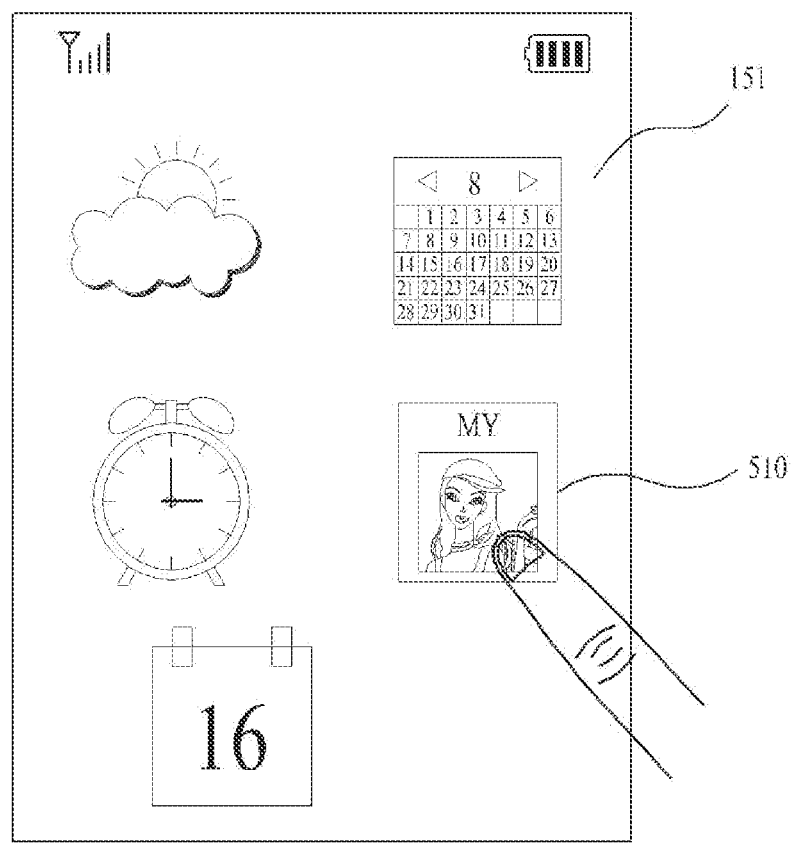
FIG. 5 is a diagram of a screen configuration for displaying a user widget for receiving an input of a command signal for providing user registration information according to the present invention.

The process of receiving use registration information [S420] is explained in detail with reference to FIG. 5. FIG. 5 is a diagram of a screen configuration for displaying a user widget for receiving a command signal for providing user registration information according to the present invention.

The mobile terminal 100 displays a plurality of widgets including a user widget 510 on the screen in a standby or widget display mode. If the user widget 510 is touched by a user, the mobile terminal 100 receives a command signal for providing user registration information. The mobile terminal 100 is also able to display a web user widget for receiving a command signal for providing web user information and a terminal user widget for receiving a command signal for providing terminal user information.

Figure 6A:
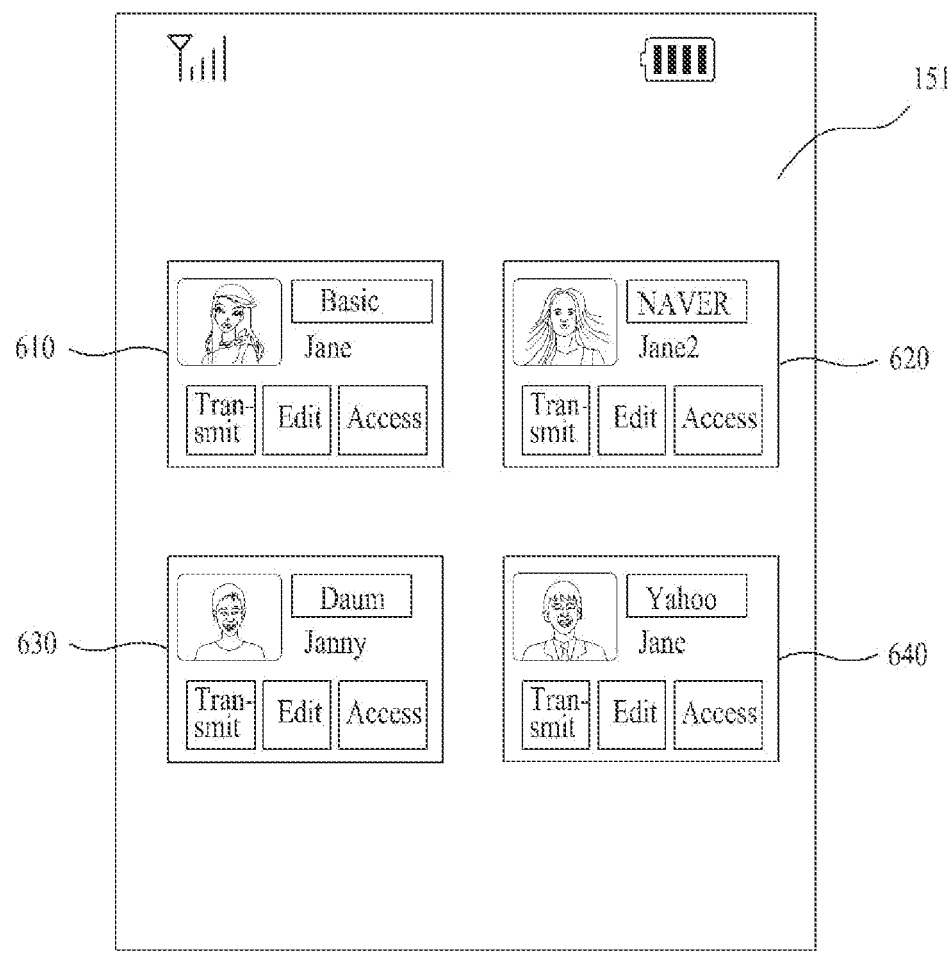
FIGS. 6A to 6D are diagrams of screen configurations for displaying a registration information indicator according to a first embodiment of the present invention.

Referring now to FIG. 6A, after receiving a command signal for providing an input of the user registration information [S420], the mobile terminal 100 displays one or more registration information indicators on the screen under the control of the controller 180 [S430]. The one or more registration information indicators can include a web registration information indicator corresponding to each of the one or more websites and a terminal registration information indicator corresponding to a mobile terminal. The registration information indicator can be displayed in the form of a card.

If the registration information indicator is the web registration information indicator, the mobile terminal 100 displays web user information registered at a corresponding website within the web registration information indicator. If the registration information indicator is the terminal registration information indicator, the mobile terminal 100 displays terminal user information within the terminal registration information indicator.

Instead of displaying the entire corresponding user registration information within the registration information indicator, the mobile terminal 100 displays schematic user registration information corresponding to a specific information item in the entire user registration information. For example, when the user registration information is the web user registration information, the schematic user registration information can include a user image, a corresponding website identifier (identification symbol, name, icon), ID information registered at a corresponding website and other information within the web registration information indicator. The mobile terminal 100 displays a control command region including at least one of a registration information transmit command region (hereinafter, "transmit region"), a registration information edit region (hereinafter, "edit region") and a corresponding website access command region in case of a web registration information indicator (hereinafter, "access region") within each of the registration information indicators.

When a plurality of the registration information indicators are displayed, the mobile terminal 100 may display all the registration information indicators having the same size. Alternatively, the mobile terminal 100 may enlarge and display a specific one of the registration information indicators while reducing and displaying the remaining registration information indicators.

In this way, detailed user registration information can be displayed within the enlarged and displayed registration information indicator and schematic user registration information can be displayed within the remaining reduced and displayed registration information indicators. The detailed user registration information can be regarded as including more information items than the schematic user registration information. The previously-explained control command region can be displayed within the enlarged and displayed registration information indicator only.

Figure 6B:
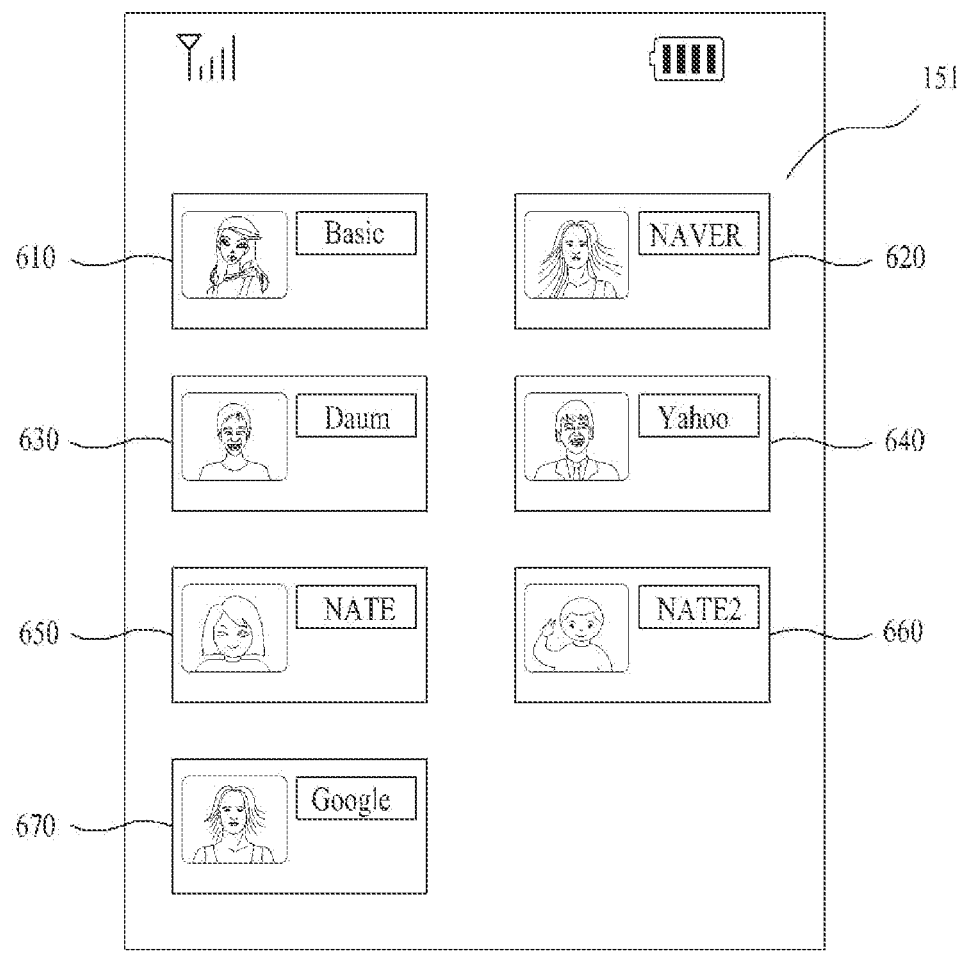

The process of displaying the registration information indicator [S430] is explained in detail with reference to FIGS. 6-7. Referring to FIGS. 6A and 6B, the mobile terminal 100 displays a plurality of registration information indicators of the same size on the display 151. A size of the corresponding registration information indicator and information items of user registration information displayed within the corresponding registration information indicator can be adjusted according to the number of the registration information indicators.

For example, if the number of the registration information indicators is 4, as in FIG. 6A, the information items of the user registration information displayed within the registration information indicator can include a user image, website identification information and ID information registered at a website. If the number of the registration information indicators is 7, as in FIG. 6B, the information items of the user registration information displayed within the registration information indicator can include a user image and website identification information.

If the size of the registration information indicator is equal to or greater than a predetermined reference, the mobile terminal 100 displays a control command region within the corresponding registration information indicator. At least one of a transmit region, an edit region and an access region can be included in the control command region. Meanwhile, a terminal registration information indicator 610 can be displayed, and 'basic' is displayed as terminal identification information.

Referring to FIGS. 7A-7D, when displaying a plurality of registration information indicators, the mobile terminal 100 is able to enlarge and display a specific one of the registration information indicators. The enlarged and displayed specific registration information indicator is called a representative registration information indicator. The representative registration information indicator can include one of a terminal registration information indicator 710, a registration information indicator designated as a representative information indicator by a user, a last displayed registration information indicator and a registration information indicator corresponding to a website last accessed using the mobile terminal 100.

Figure 7A:
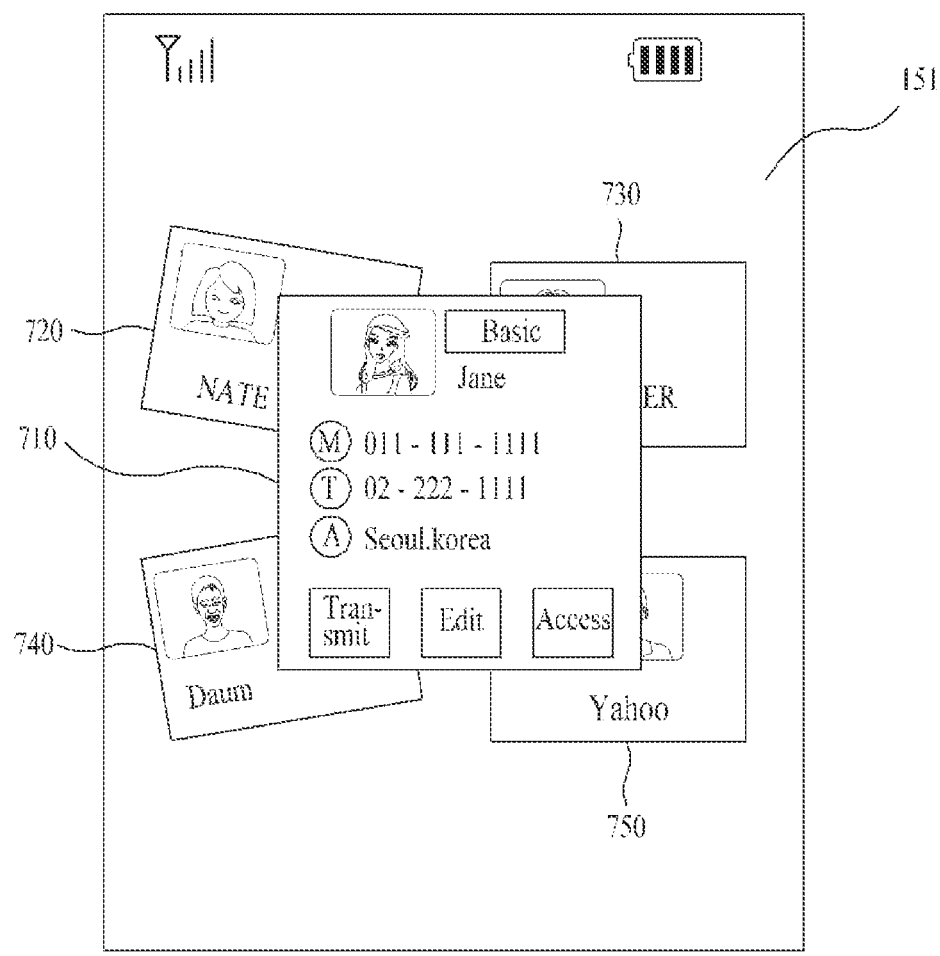
FIGS. 7A to 7F are diagrams of screen configurations for displaying a registration information indicator according to a second embodiment of the present invention.
Figure 7B:
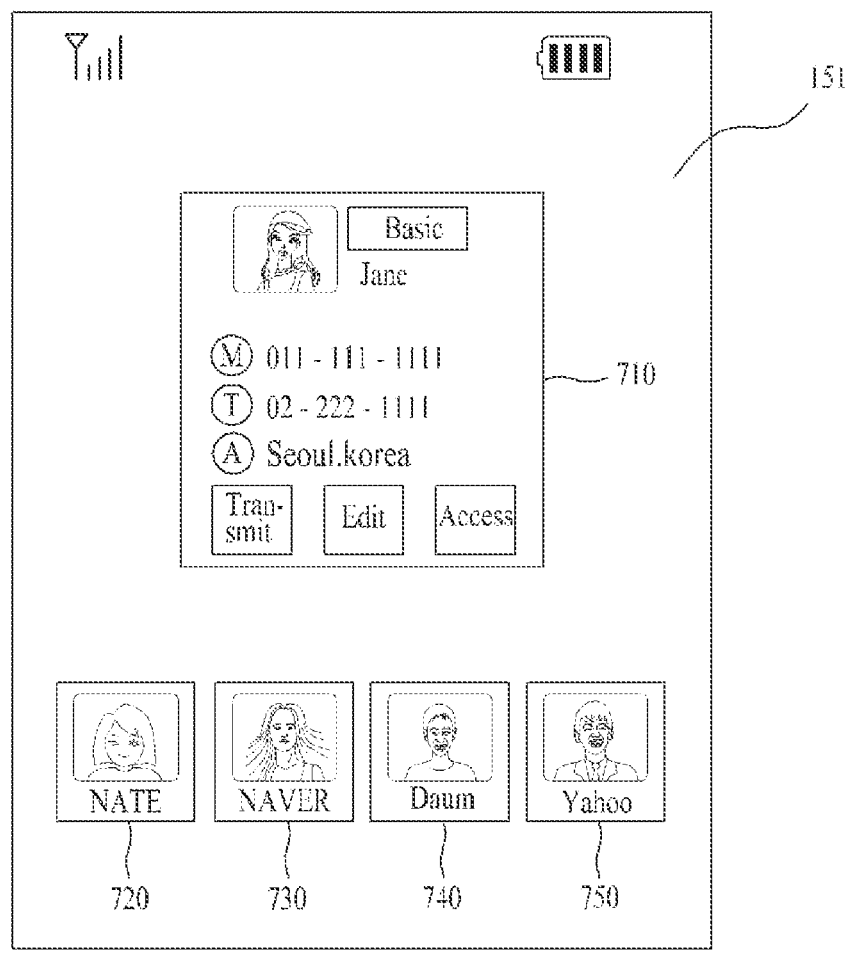

For example, in arranging a plurality of the registration information indicators, the mobile terminal 100 may place the representative registration information indicator 710 at a center of the display 151 and then randomly places the rest of the registration information indicators behind the representative registration information indicator 710, as illustrated in FIG. 7A. Alternatively, the mobile terminal 100 places the representative registration information indicator 710 at a center of the display 151 and places the remaining registration information indicators at a bottom side of the display in a row, as illustrated in FIG. 7B.

Figure 7C:
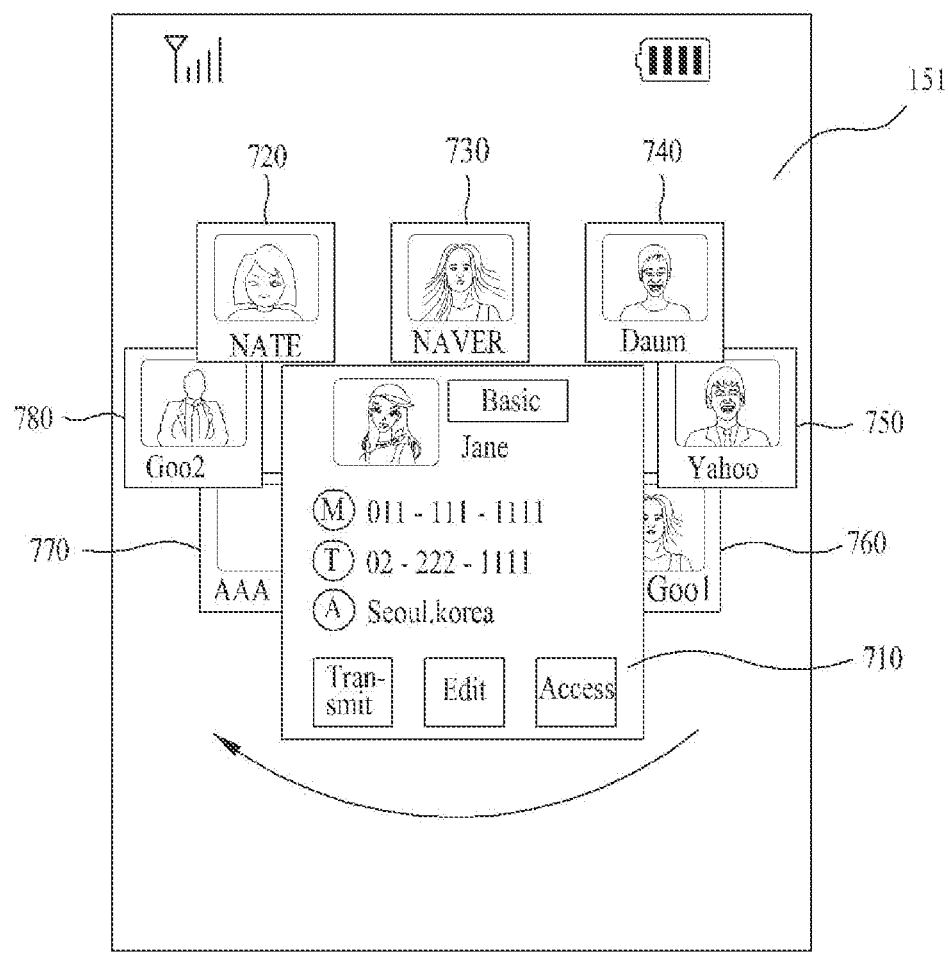

Referring to FIG. 7C, the mobile terminal 100 may place the representative registration information indicator 710 at a center of the display 151 and rotationally place the remaining registration information indicators behind the representative registration information indicator. Moreover, the mobile terminal 100 rotationally displays a plurality of the registration information indicators including representative registration information indicator 710 and sets the registration information indicator placed in front as a representative registration information indicator. Hence, the representative registration information indicator can be periodically changed by the rotation of the registration information indicator.

Figure 7D:
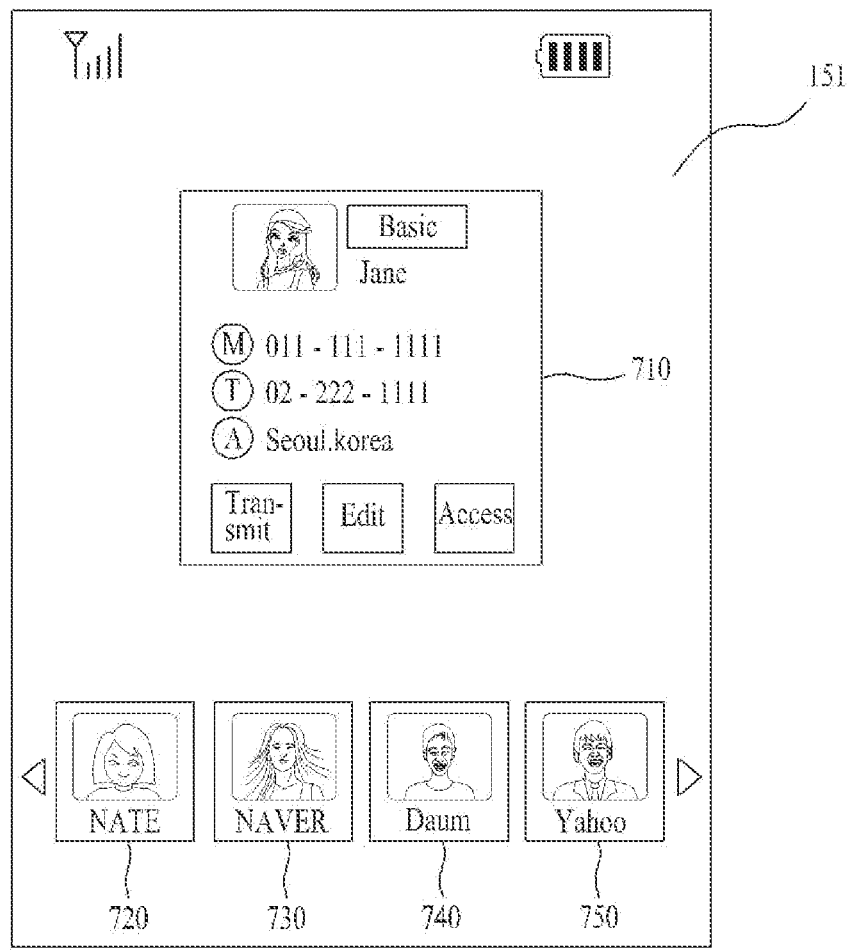

Alternatively, the mobile terminal 100 may display the rest of the registration information indicators placed at the bottom side in a row in a manner of moving in a predetermined direction at a constant speed, or scrolling, as illustrated in FIG. 7D. This is advantageous when the registration information indicators are difficult to display on one screen.

Referring again to FIG. 4, the mobile terminal 100 has a specific registration information indicator selected from the one or more displayed registration information indicators via the user input unit [S440].

When the display 151 is a touchscreen and the specific registration information indicator is touched by a user, the specific registration information indicator is selected. Alternatively, when unique numbers are designated for the one or more registration information indicators, respectively, and a numeral key having a specific number assigned thereto is manipulated by a user, the mobile terminal 100 selects the specific registration information indicator having the specific number assigned thereto. The mobile terminal 100 may also select the specific registration information indicator via a direction key manipulated by a user.

The mobile terminal 100 updates user registration information corresponding to the specific registration information indicator according to a selection for the specific registration information indicator. In this case, the specific registration information indicator is limited to a web registration information indicator.

For example, if a specific registration information indicator is selected [S440], the mobile terminal 100 transmits a request signal for user registration information to a website corresponding to the specific registration information indicator via the wireless communication unit 110. The mobile terminal 100 then receives the user registration information from the corresponding website.

Subsequently, the mobile terminal 100 updates user registration information previously stored in the memory 160 with reference to the received user registration information and then displays the updated user registration information within an enlarged and displayed specific registration information indicator [S450]. The mobile terminal 100 enlarges and displays the selected specific registration information indicator and also displays corresponding user registration information and a control command region within the enlarged and displayed registration information indicator under the control of the controller 180 [S450].

Figure 6C:
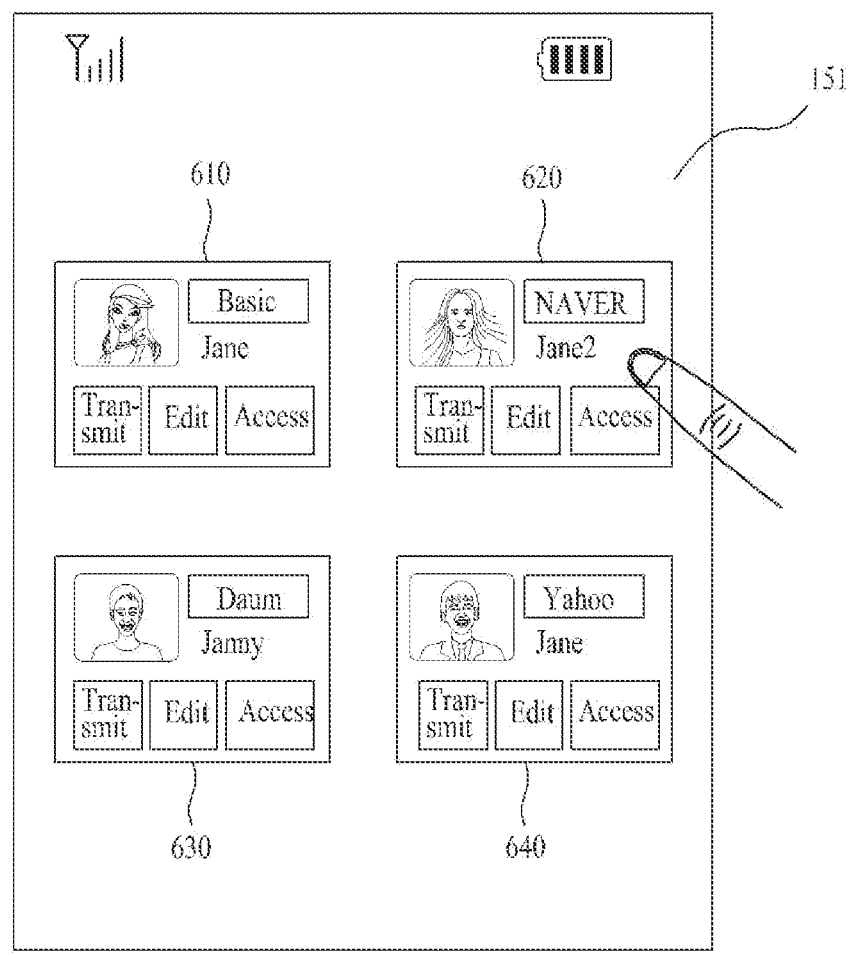
Figure 6D:
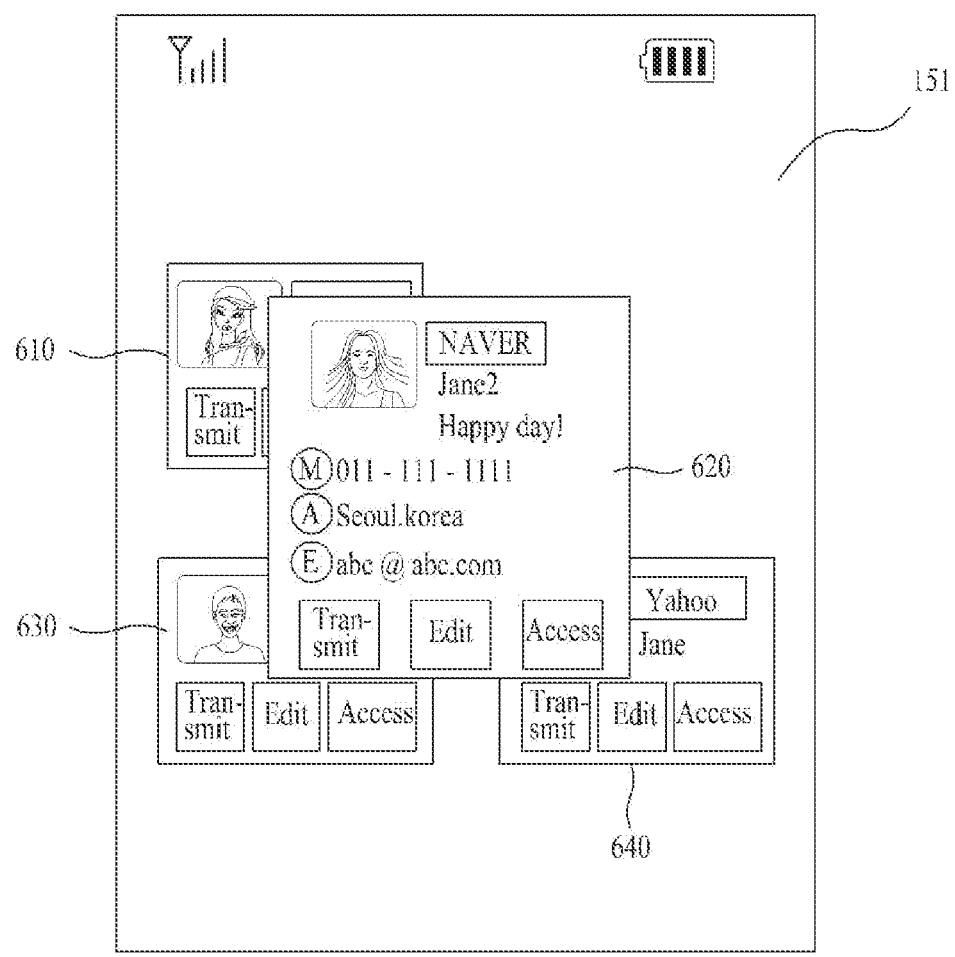

Selecting a registration information indicator [S440] and displaying the selected registration information indicator [S450] are explained in detail with reference to FIGS. 6-7. Referring to FIGS. 6C and 6D, if a specific registration information indicator 620 is selected from a plurality of registration information indicators by a user, as illustrated in FIG. 6C, the mobile terminal 100 enlarges and displays the specific registration information indicator 620 on the display 151, as illustrated in FIG. 6D, and also displays detailed user registration information and a control command region within the specific registration information indicator 620.

Figure 7E:
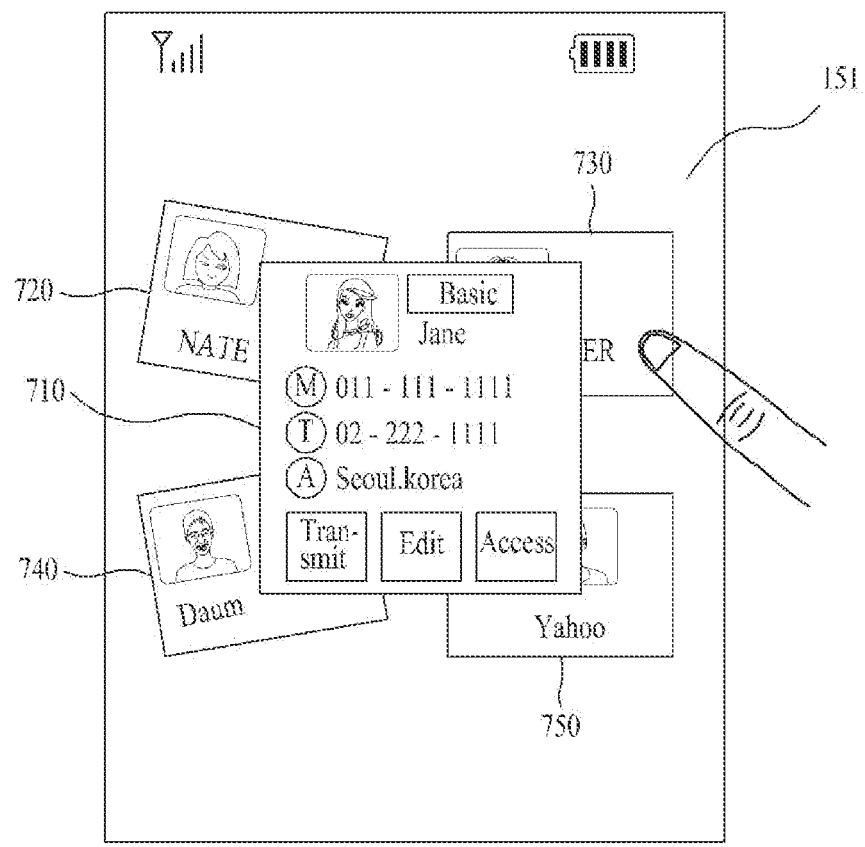
Figure 7F:
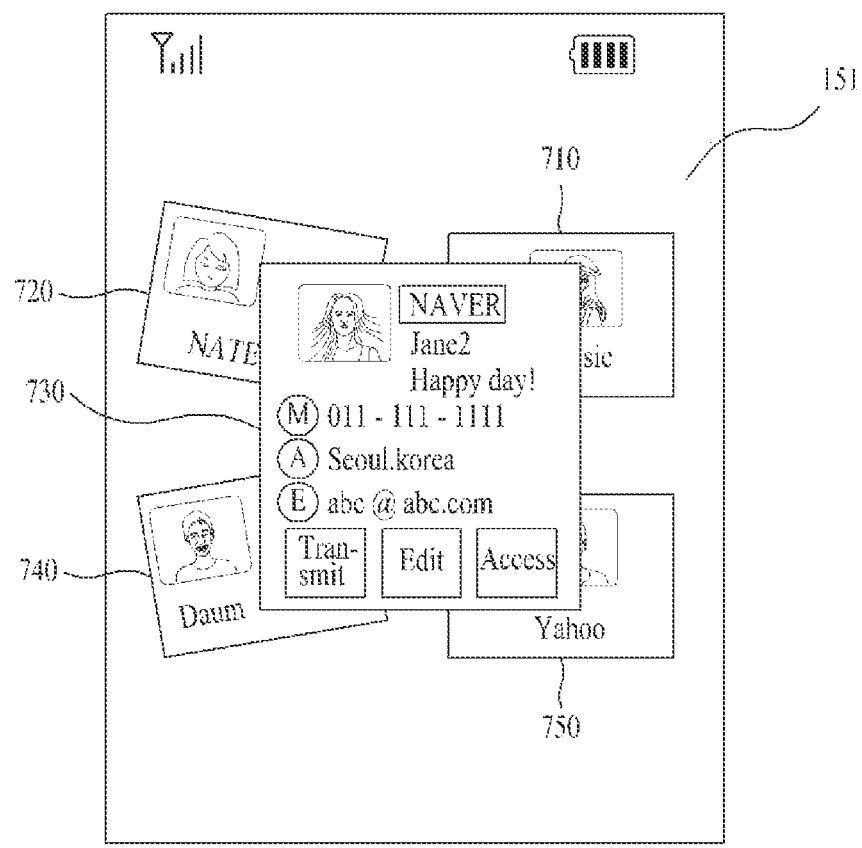

Referring to FIGS. 7E and 7F, if a specific registration information indicator 730 is selected by a user from a plurality of registration information indicators including a representative registration information indicator 710, as illustrated in FIG. 7E, the mobile terminal 100 enlarges and displays the specific registration information indicator 730 on the display 151, as illustrated in FIG. 7F, and also displays detailed user registration information and a control command region within the specific registration information indicator 730.

Assuming that the specific registration information indicator 620 or 730 is a web registration information indicator, the detailed user registration information can include a user image registered as a website, website identification information, ID information registered at the website, a nickname registered as the website, a wireless phone number, a landline phone number, an address and/or an email. The control command region can include a transmit region, an edit region or an access region.

Referring again to FIG. 4, if a specific control command region within the control command region included in the registration information indicator is activated by a user selection, the mobile terminal 100 performs a control operation corresponding to the activated specific control command region [461, 462, 471, 472, 481, 482].

As mentioned in the foregoing description, the control command region can be displayed within the registration information indicator or the enlarged and displayed registration information indicator (e.g., a representative registration information indicator or a registration information indicator touched by a user). As also mentioned in the foregoing description, the control command region can include at least one of a transmit region, an edit region and an access region (when the registration information indicator is a web registration information indicator). Moreover, a registration information update command region (hereinafter, "update region") or a "more registration information view" command region (hereinafter, "more view region") can be included in the control command region.

If the transmit region is activated [S461], the mobile terminal 100 transmits the user registration information displayed within the registration information indicator including the activated transmit region or the web registration information (or terminal registration information) corresponding to the registration information indicator including the activated transmit region to another terminal via the wireless communication unit 110 under the control of the controller 180 [S462].

If the edit region is activated [S471], the mobile terminal 100 sets a registration information edit mode and then displays an image for editing the web registration information (or terminal registration information) corresponding to the registration information indicator including the activated edit region via the display unit 151 under the control of the controller 180 [S472].

If the access region is activated [S481], the mobile terminal 100 accesses a website corresponding to the registration information indicator including the activated access region using the wireless communication unit 110 under the control of the controller 180 [S482].

In the following description, a process for performing a control operation according to activation of a control command region is explained in detail with reference to FIGS. 8-17. For clarity and convenience of the following description, an exemplary case where a control command region is displayed within an enlarged and displayed registration information indicator is described.

Figure 8:
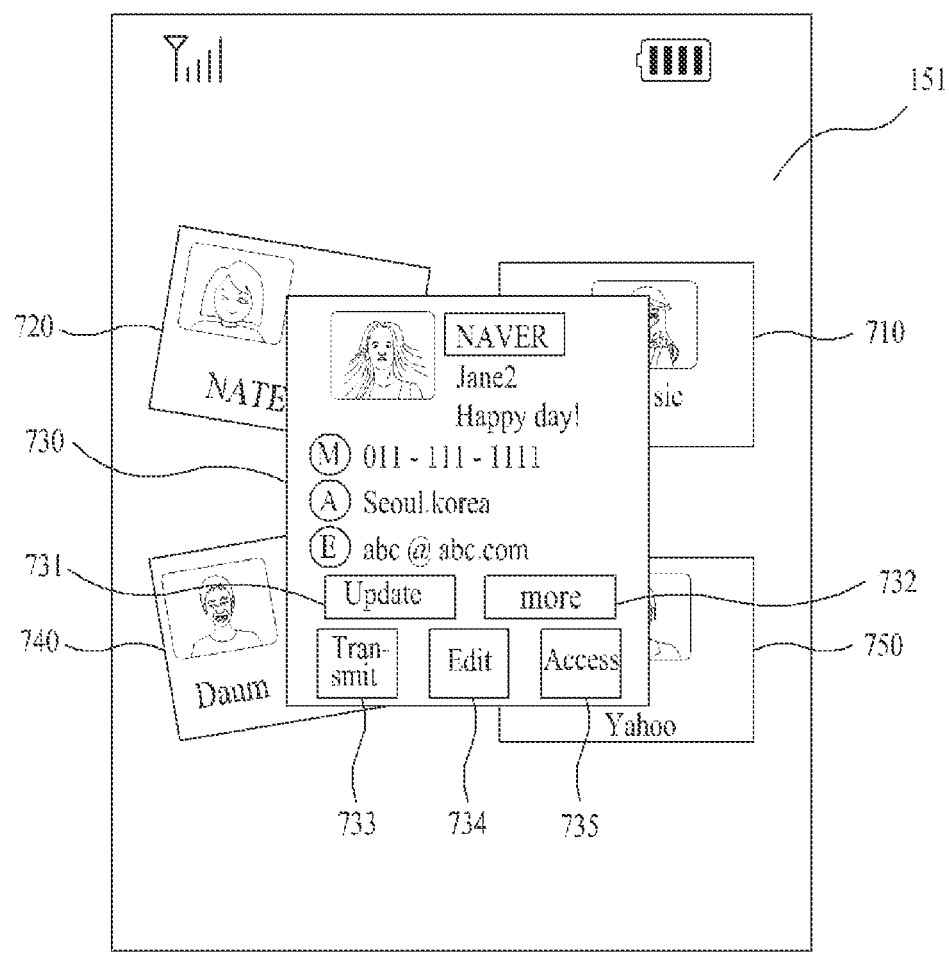
FIG. 8 is a diagram of a screen configuration for displaying a control command region within a registration information indicator according to the present invention.

FIG. 8 is a diagram of a screen configuration for displaying a control command region within a registration information indicator 730. An update region 731, a more view region (more) 732, a transmit region 733, an edit region 734 and an access region 735 can be included as a control command region in the registration information indicator 730.

Figure 9A:
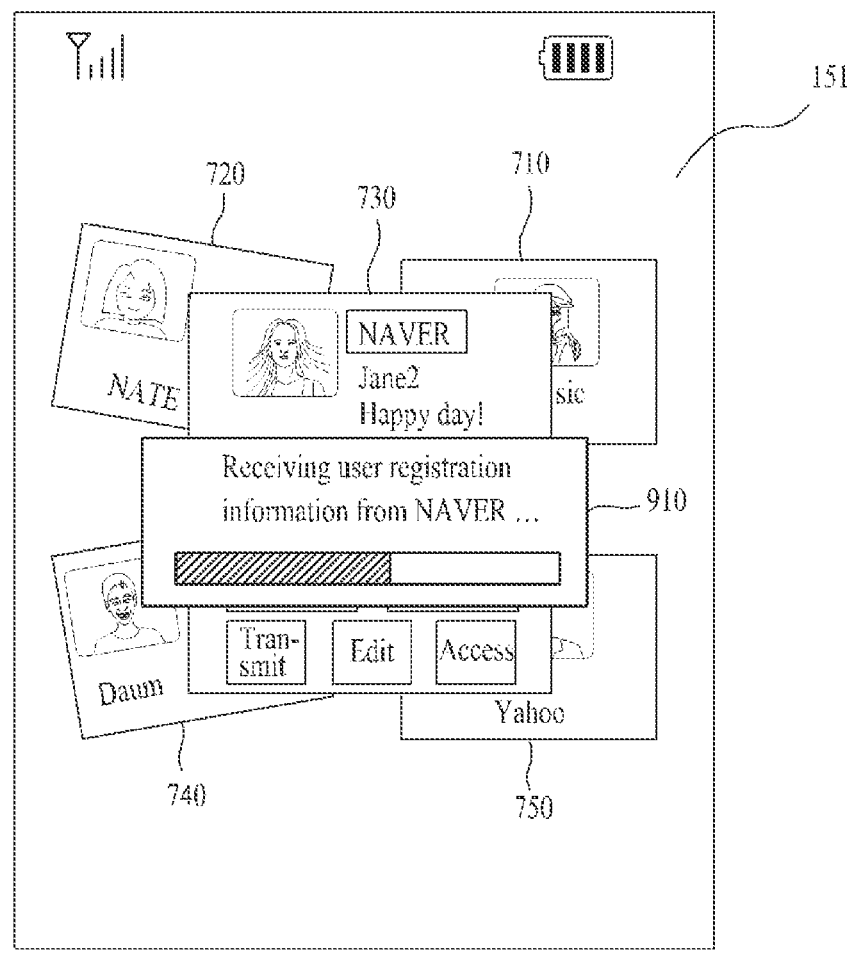
FIGS. 9A to 9D are diagrams of screen configurations when an update command region is selected in FIG. 8.
Figure 9B:
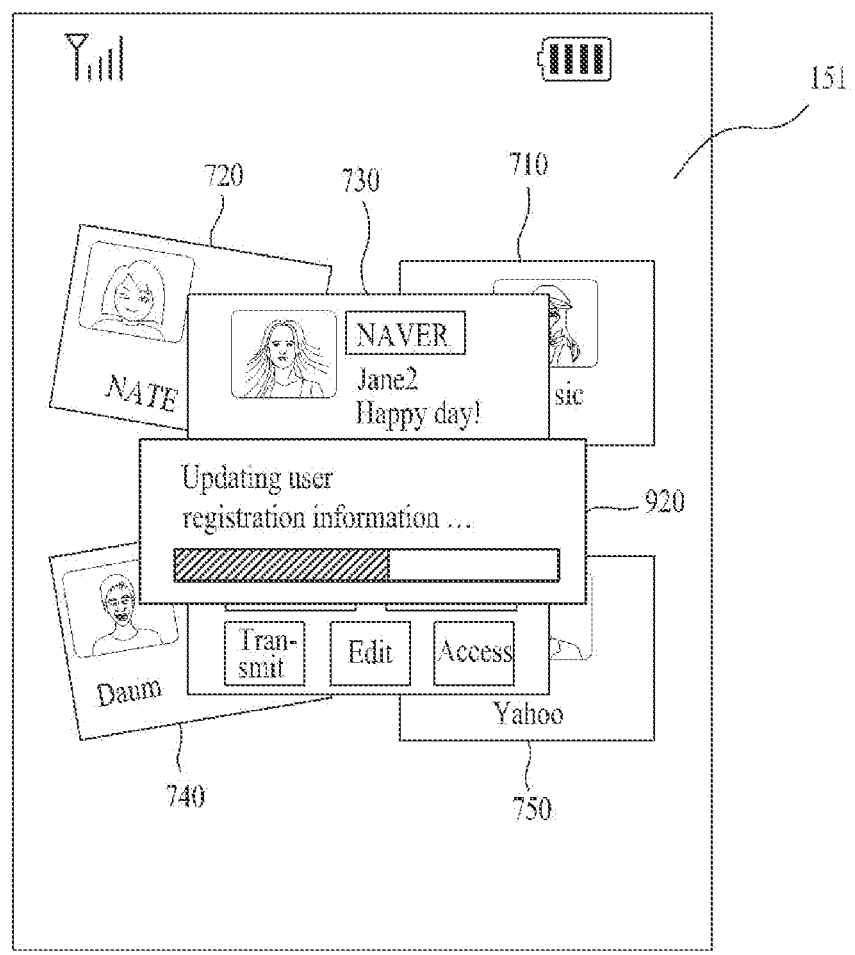

FIGS. 9A-9D are diagrams of screen configurations that are displayed when the update command region 731 is selected in FIG. 8. Referring to FIG. 9A, if the update region 731 is activated according to a user selection, the mobile terminal 100 transmits a request signal for user registration information to a website corresponding to the registration information indicator 730 and then receives the user registration information from the corresponding website. Subsequently, the mobile terminal 100 updates user registration information previously stored in the memory 160 with reference to the received user registration information, as illustrated in FIG. 9B.

Figure 9C:
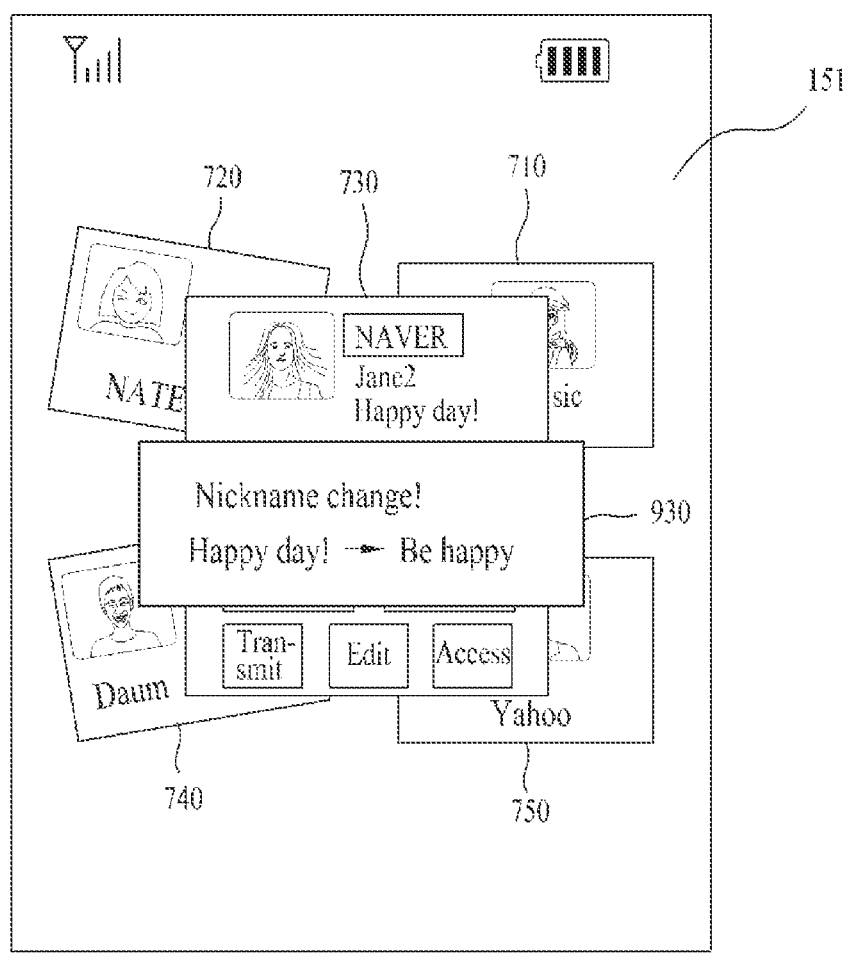
Figure 9D:
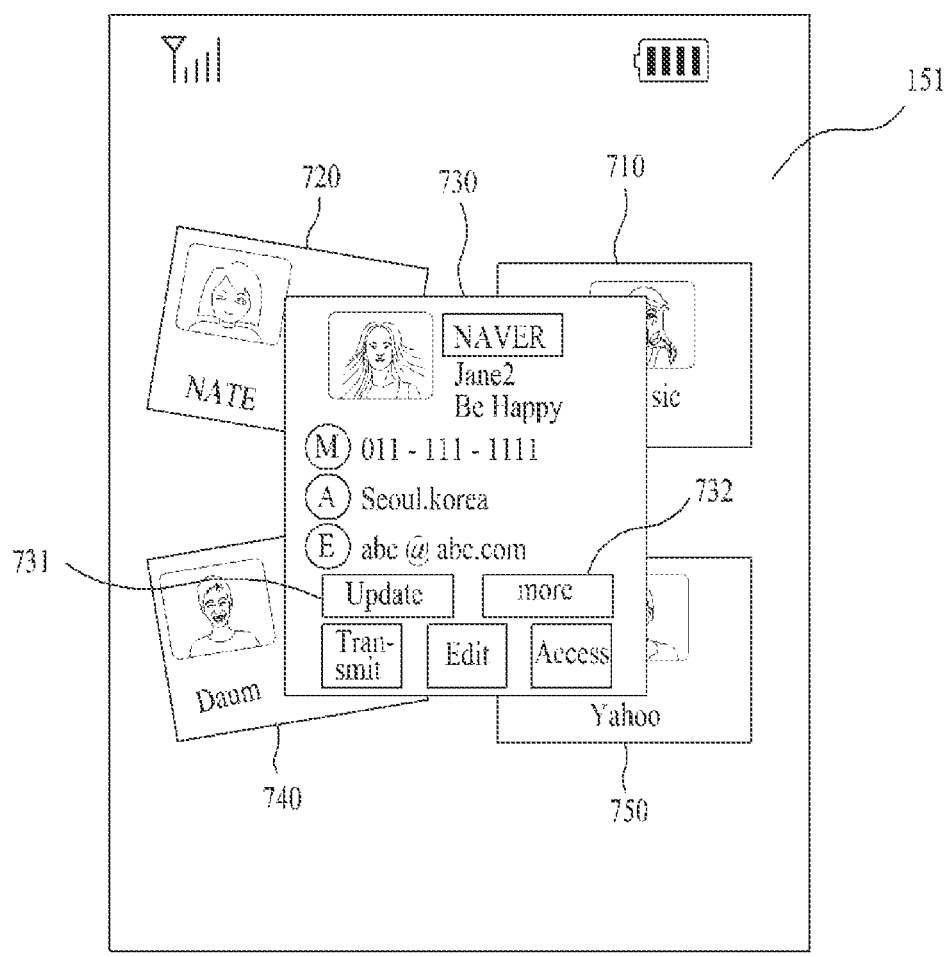

Referring to FIGS. 9C and 9D, if a nickname is changed into 'Be happy' from 'Happy day' as a result of the update illustrated in FIG. 9B, the mobile terminal 100 outputs the changed result, as illustrated in FIG. 9C. The mobile terminal 100 then displays the user registration information having the changed result reflected thereon within the registration information indicator 730 on the display 151, as illustrated in FIG. 9D.

Figure 10:
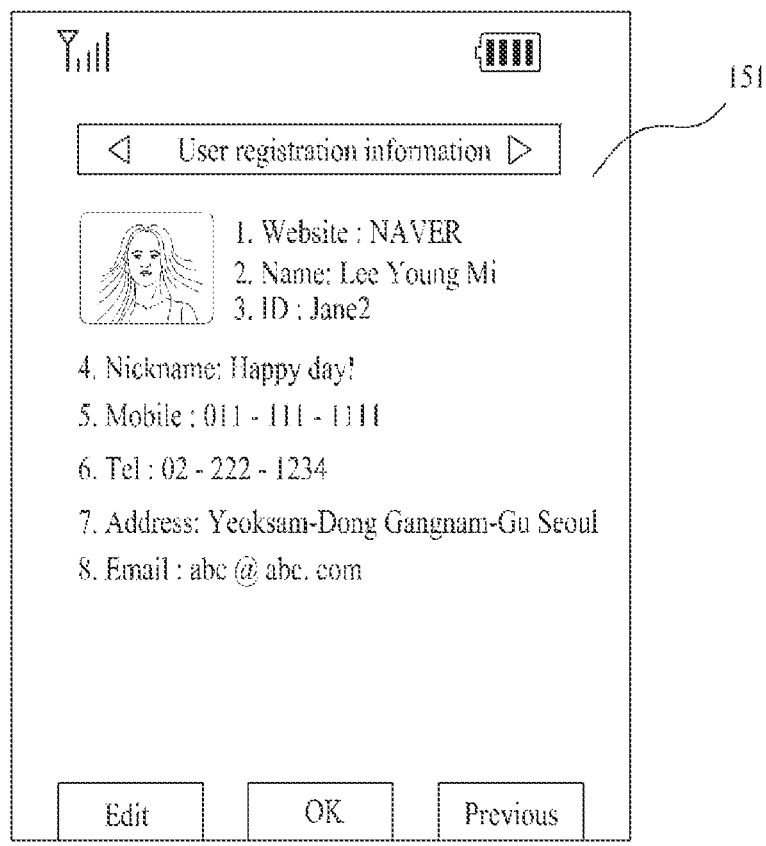
FIG. 10 is a diagram of a screen configuration when a more-view command region "more" is selected in FIG. 8.

FIG. 10 is a diagram of a screen configuration that is displayed when the more-view command region (more) 732 is selected in FIG. 8. Referring to FIG. 10, if the more view region 732 is activated according to a user selection, the mobile terminal 100 sets a display mode of the user registration information corresponding to the registration information indicator 730. The mobile terminal 100 then displays the user registration information corresponding to the registration information indicator 730 on the display 151.

Figure 11A:
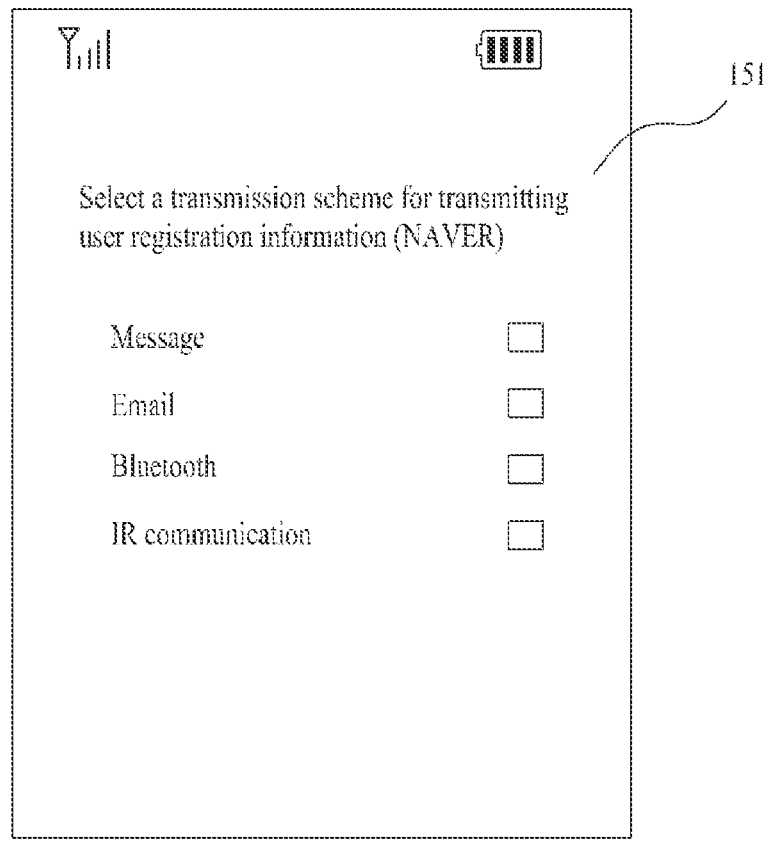
FIGS. 11A to 11D are diagrams of screen configurations when a transmit command region is selected in FIG. 8.

FIGS. 11A to 11D are diagrams of screen configurations displayed when the transmit command region 733 is selected in FIG. 8. Referring to FIG. 11A, if the transmit region 733 is activated according to a user selection, the mobile terminal 100 displays a transmission scheme list on the display 151. For example, the transmission scheme list can include a transmission scheme of user registration information as a message, an email, Bluetooth™ and an infrared communication.

Figure 11B:
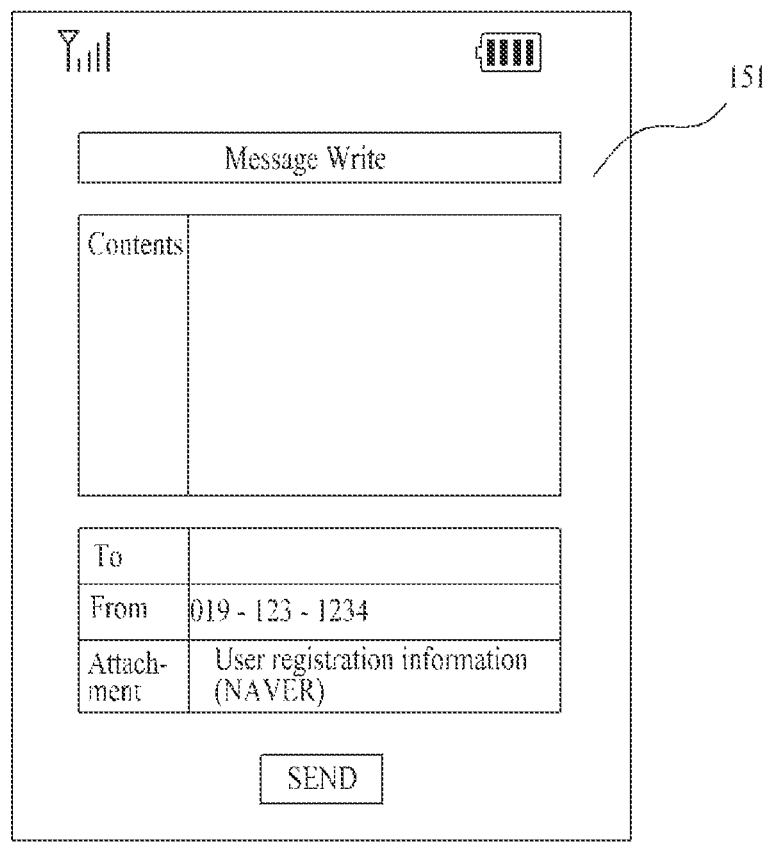

Referring to FIG. 11B, if the message is selected as the transmission scheme in FIG. 11A, the mobile terminal 100 displays a message write window to which the user registration information corresponding to the registration information indicator 730 is attached as an attachment file.

Figure 11C:
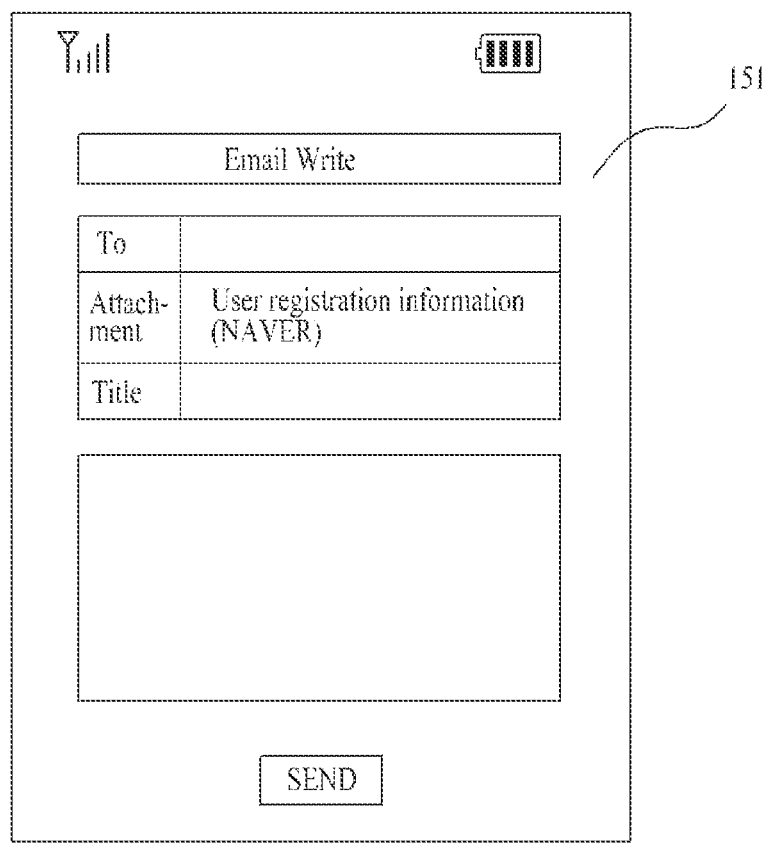

Referring to FIG. 11C, if an email is selected as the transmission scheme in FIG. 11A, the mobile terminal displays an email write window to which the user registration information corresponding to the registration information indicator 730 is attached as an attachment file. Hence, the mobile terminal 100 is able to send a message or email, to which the user registration information corresponding to the registration information indicator 730 is attached as the attachment file, to a specific other party terminal by a user.

Figure 11D:
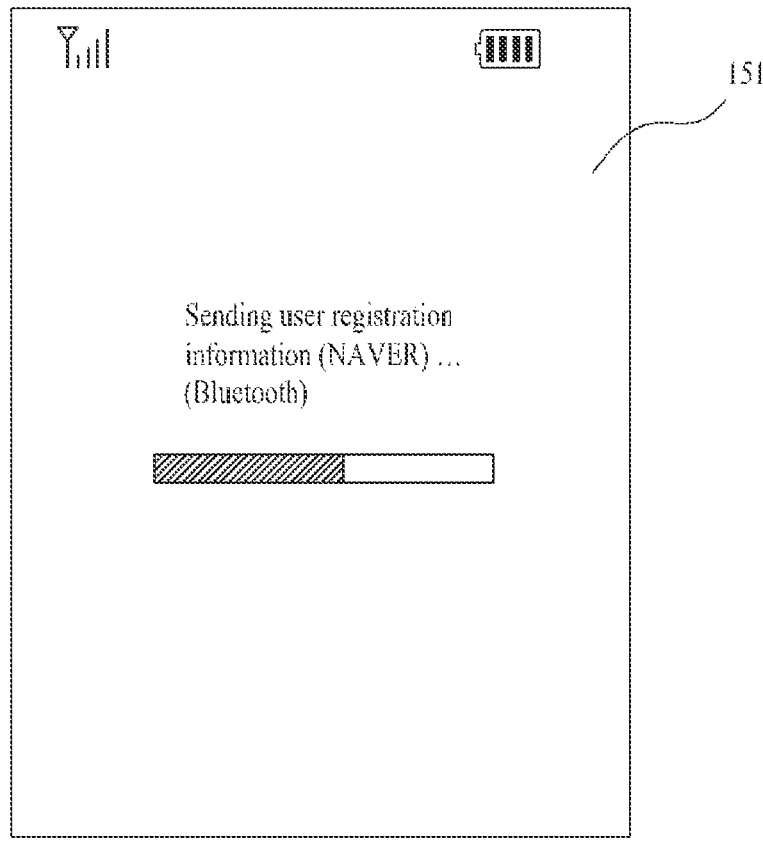

Referring to FIG. 11D, if Bluetooth™ is selected as the transmission scheme in FIG. 11A, the mobile terminal 100 searches for an available terminal having Bluetooth™ communication capabilities and transmits the user registration information corresponding to the registration information indicator 730 to the searched terminal using the Bluetooth™ communication.

Figure 12A:
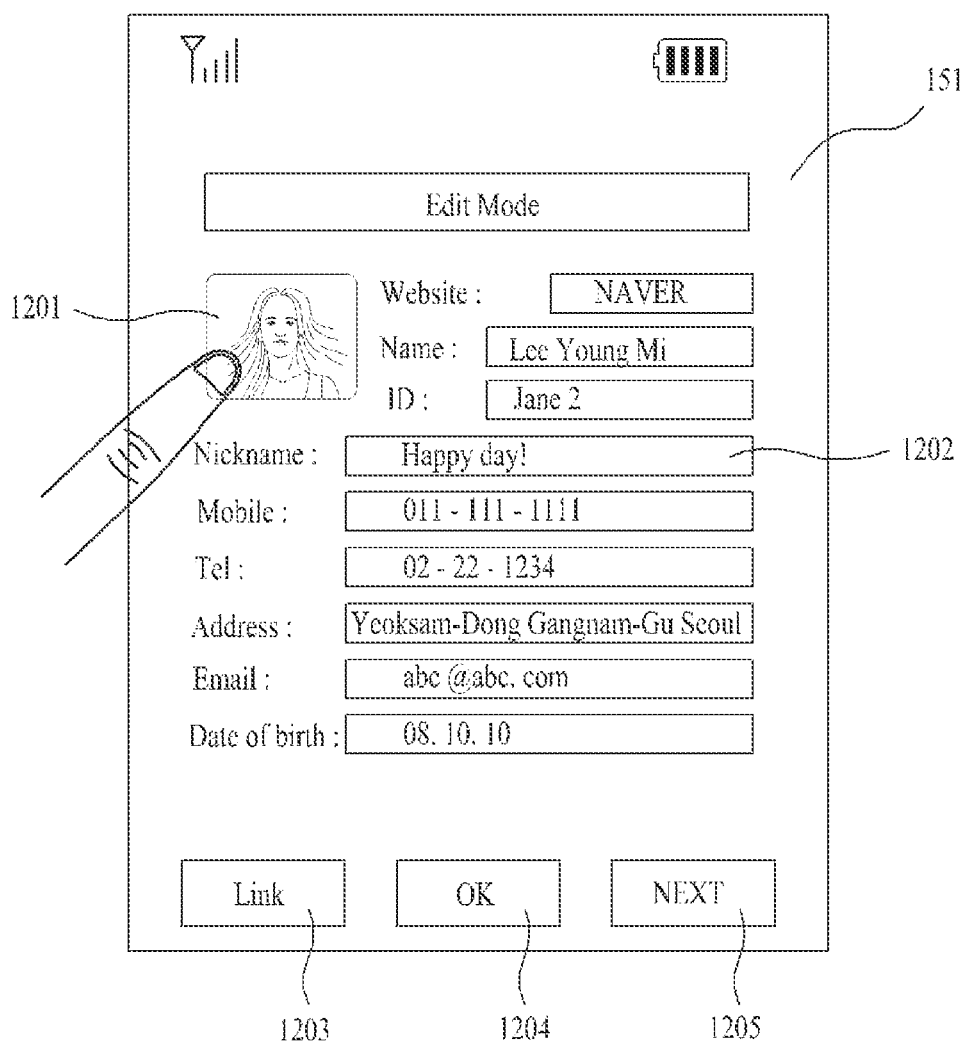
FIGS. 12A to 12F are diagrams of screen configurations when an edit command region is selected in FIG. 8.

FIGS. 12A to 12F are diagrams of screen configurations displayed when the edit region 734 is selected in FIG. 8. Referring to FIG. 12A, if the edit region 734 illustrated in is activated according to a user selection, the mobile terminal 100 sets a user registration information edit mode and displays an image for editing user registration information corresponding to the registration information indicator 730 on the display 151. The image for editing the user registration information can display the user registration information.

Figure 12B:
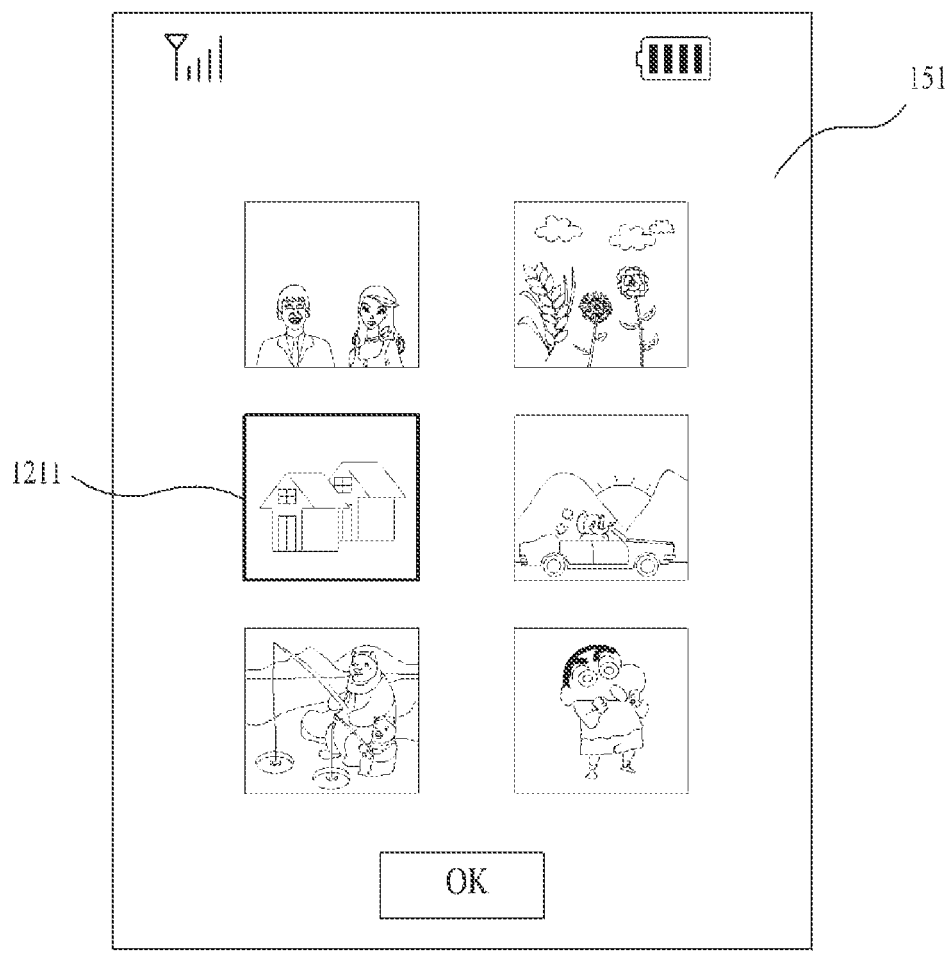
Figure 12C:
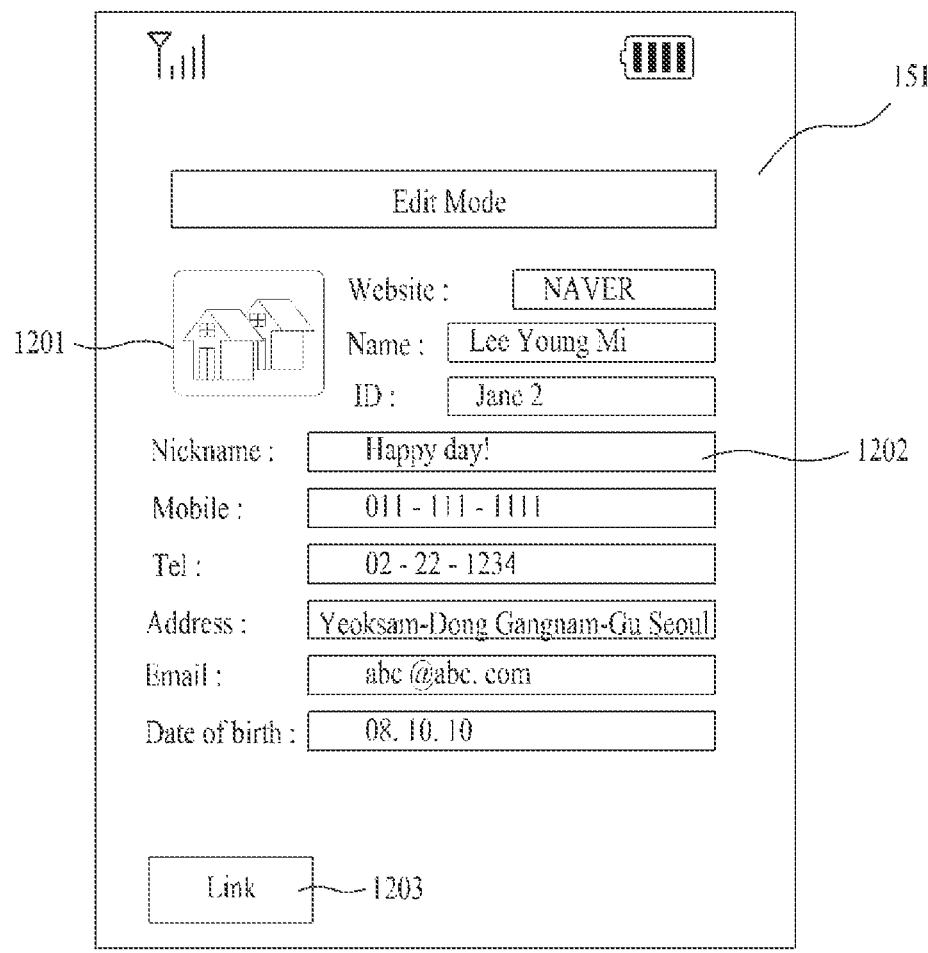
Figure 12D:
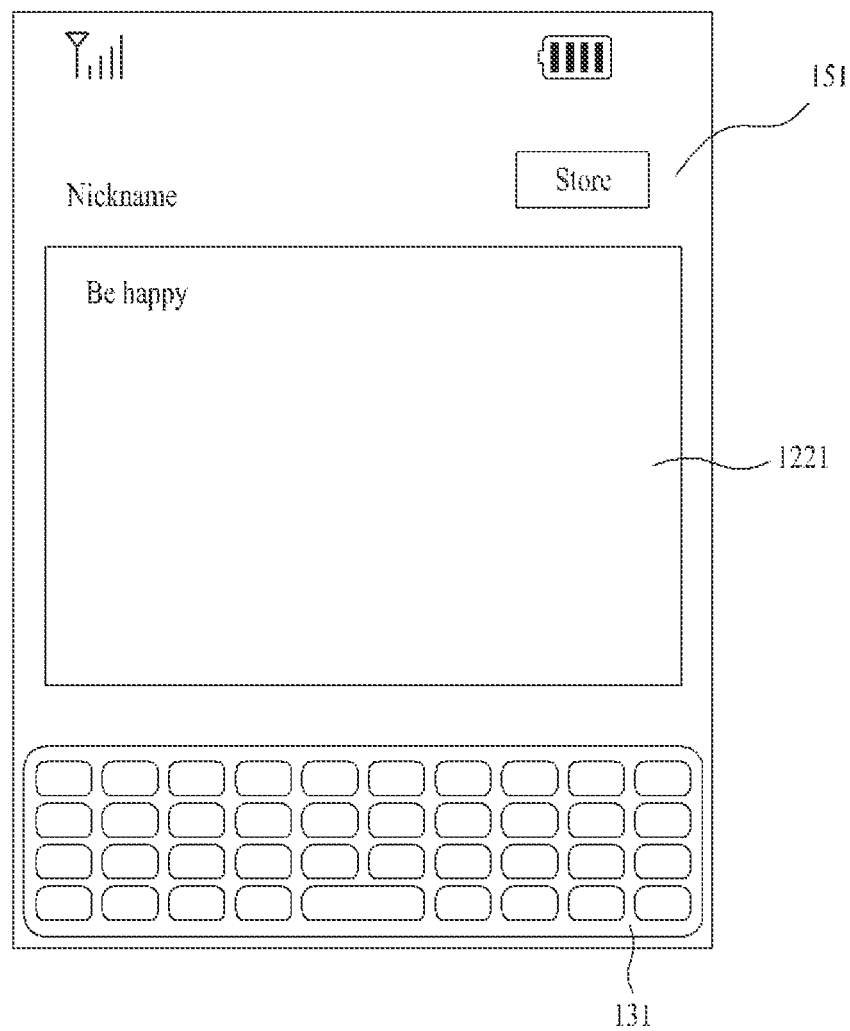
Figure 12E:
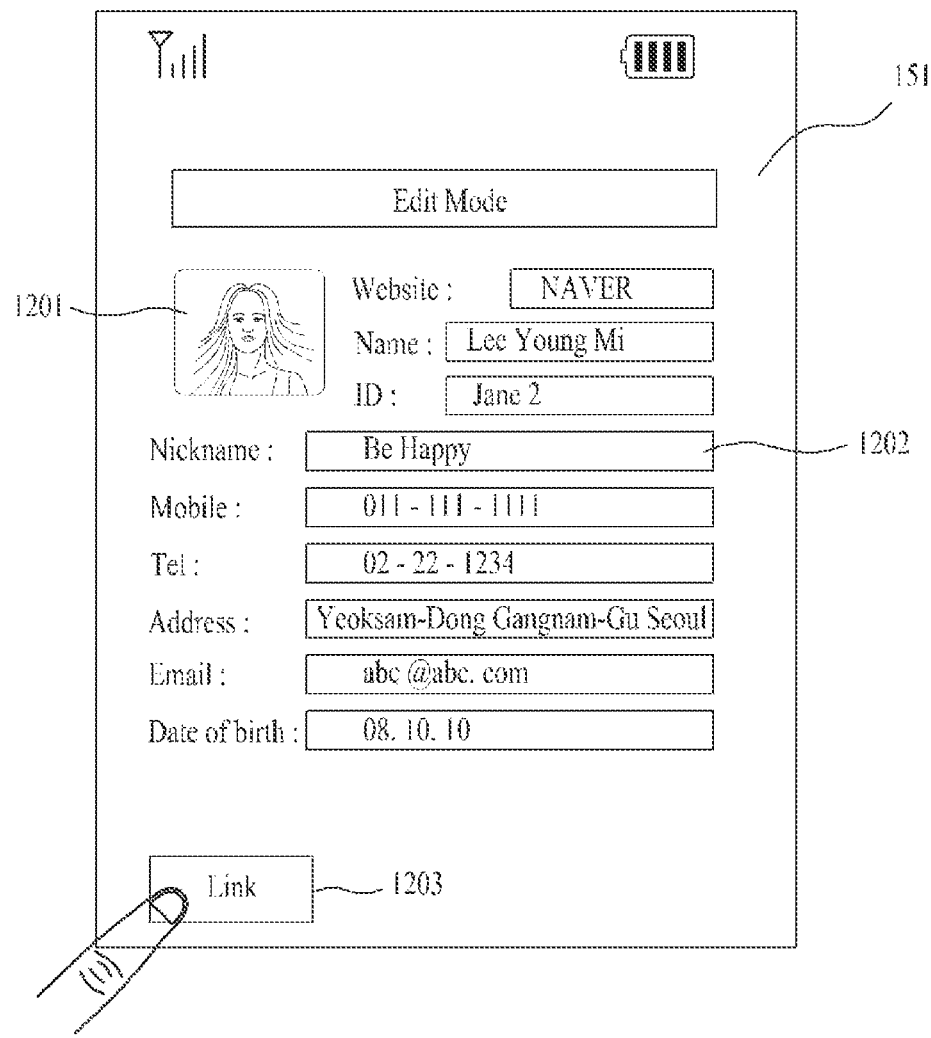

Referring to FIGS. 12B and 12C, if a user image 1201 is selected from the displayed user registration information shown in FIG. 12A, the mobile terminal 100 displays a photo list, a thumbnail list or text (photo name) list on the display 151, including at least one photo stored in the memory 160, as illustrated in FIG. 12B, and updates the user image to the photo selected from the displayed photo list by a user, as illustrated in FIG. 12C. Referring to FIGS. 12D and 12E, if a nickname 1202 is selected from the displayed user registration information shown in FIG. 12A, the mobile terminal 100 displays a nickname input window 1221 on the display 151, as illustrated in FIG. 12D, and updates a previous nickname (Happy day!) into a new nickname (Be happy) input via the nickname input window 1221, as illustrated in FIG. 12E. User registration information corresponding to information items other than the user image and the nickname can be edited in the previously described manner.

Figure 12F:
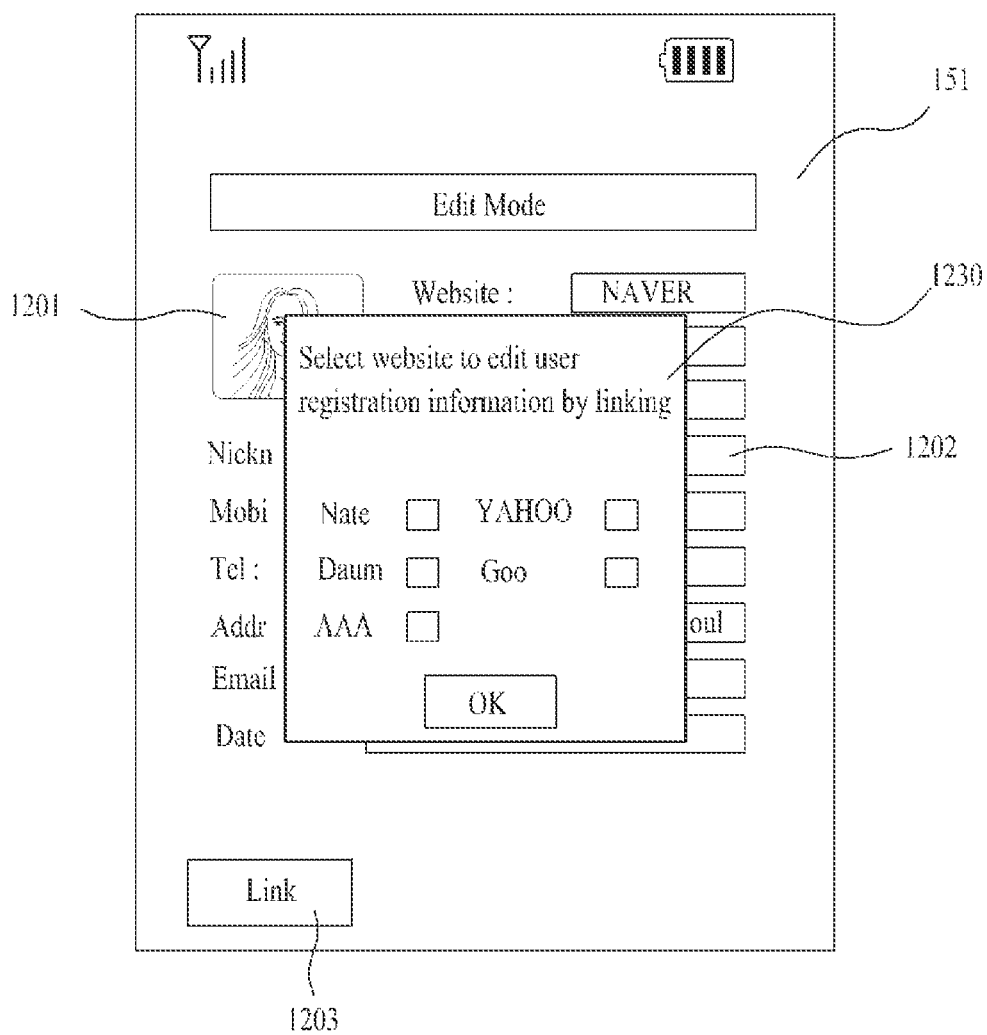

Referring to FIG. 12F, if a link region 1203 is activated according to a user selection in one of FIG. 12A, 12C or 12E, the mobile terminal 100 enables another website to be selected for user registration information updating by reflecting the user registration information of the website corresponding to the displayed registration information indicator 730 shown in FIG. 8 as it is. In FIG. 12F, a website list 1230 is displayed from which an update target website of the user registration may be selected.

For example, when the website corresponding to the registration information indicator 730 illustrated in FIG. 7F is a first website, if a second website is selected from the website list 1230, the mobile terminal 100 updates user registration information of the second website with reference to user registration information of the first website. It does not matter if information items of the user registration information of the first and second websites are the same. If the information items are different from each other, the update operation is not performed or can be performed on the matching information item only.

Figure 13A:
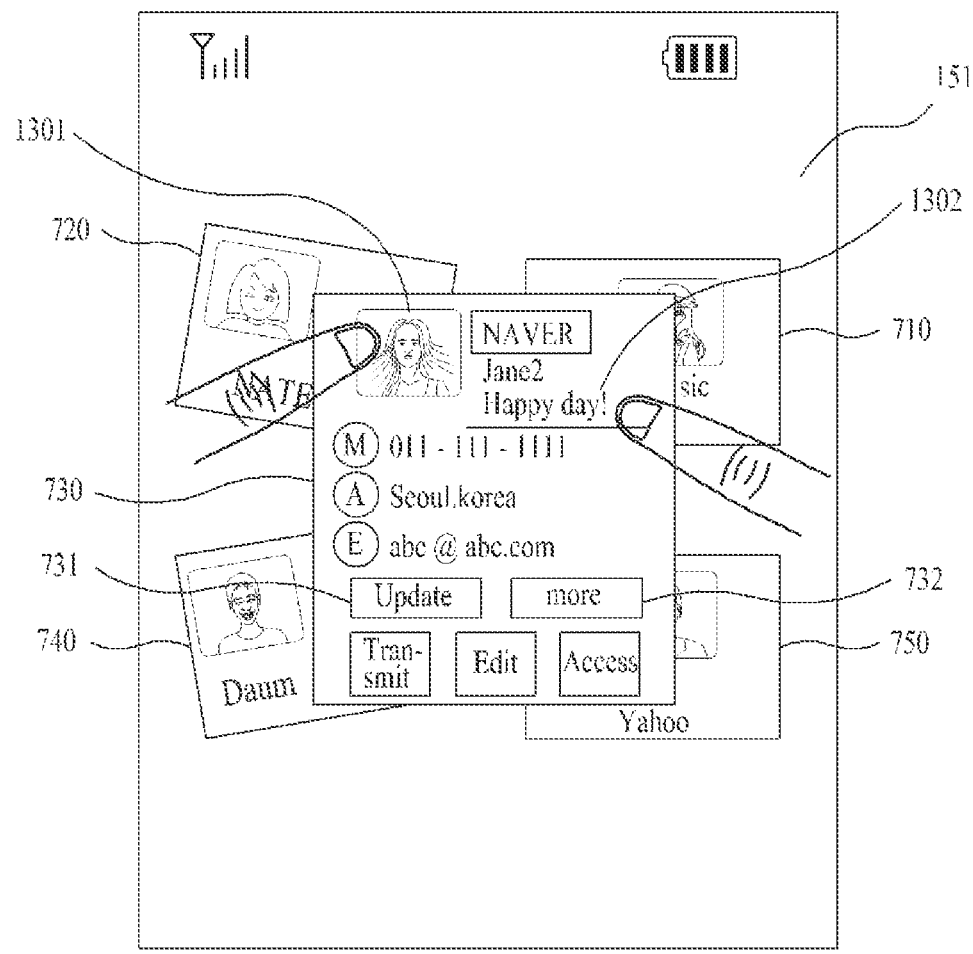
FIGS. 13A to 13E are diagrams of screen configurations when an editing mode of a specific information item is directly entered and the specific information item is selected from the registration information indicator shown in FIG. 8.

FIGS. 13A to 13E are diagrams of screen configurations displayed when an editing mode of a specific information item is directly entered and the specific information item is selected from the registration information indicator shown in FIG. 8. Referring to FIG. 13A, the mobile terminal 100 can receive a selection of an information item of user registration information displayed within the registration information indicator 730 directly from a user. In particular, this selecting method can include a user touch input for a corresponding information item.

Figure 13B:
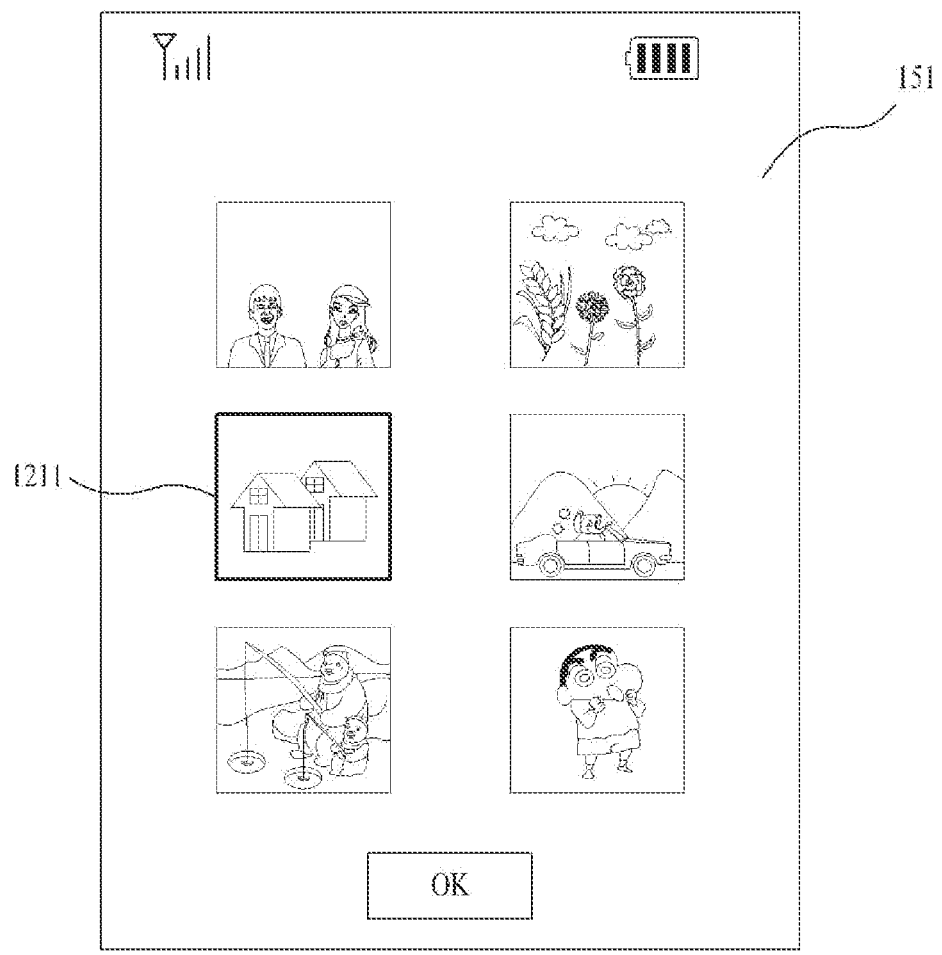
Figure 13C:
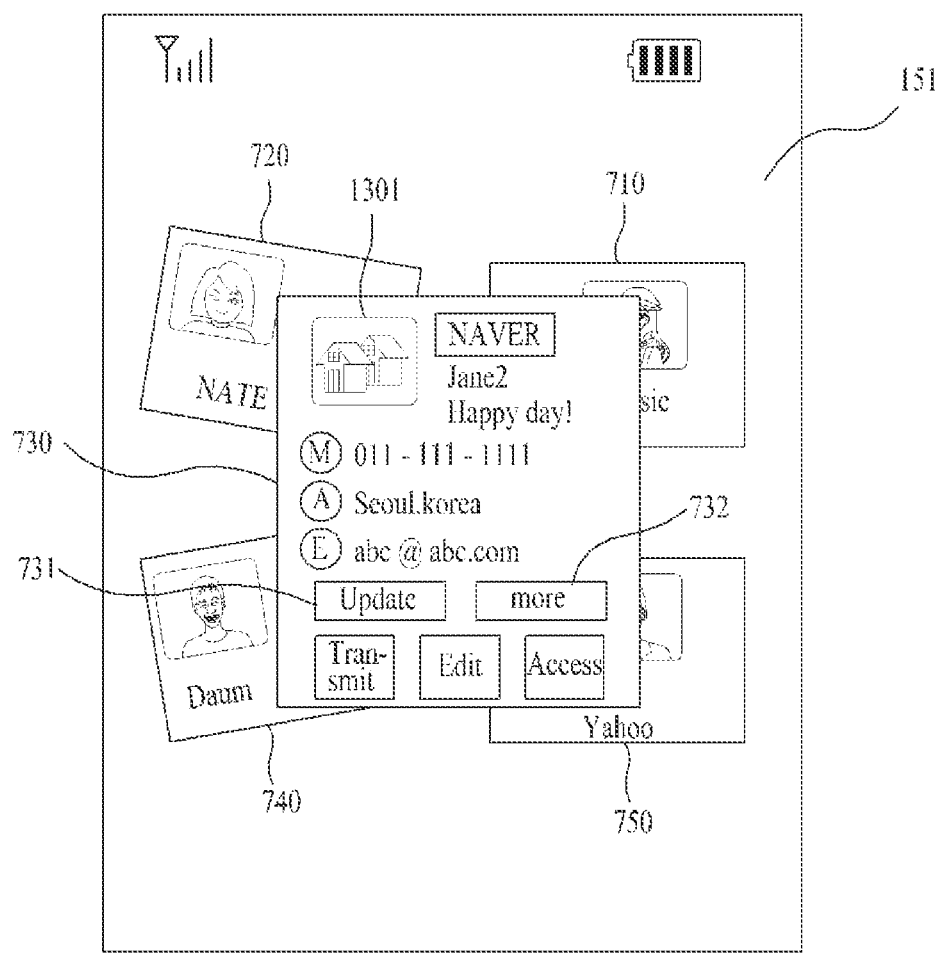
Figure 13D:
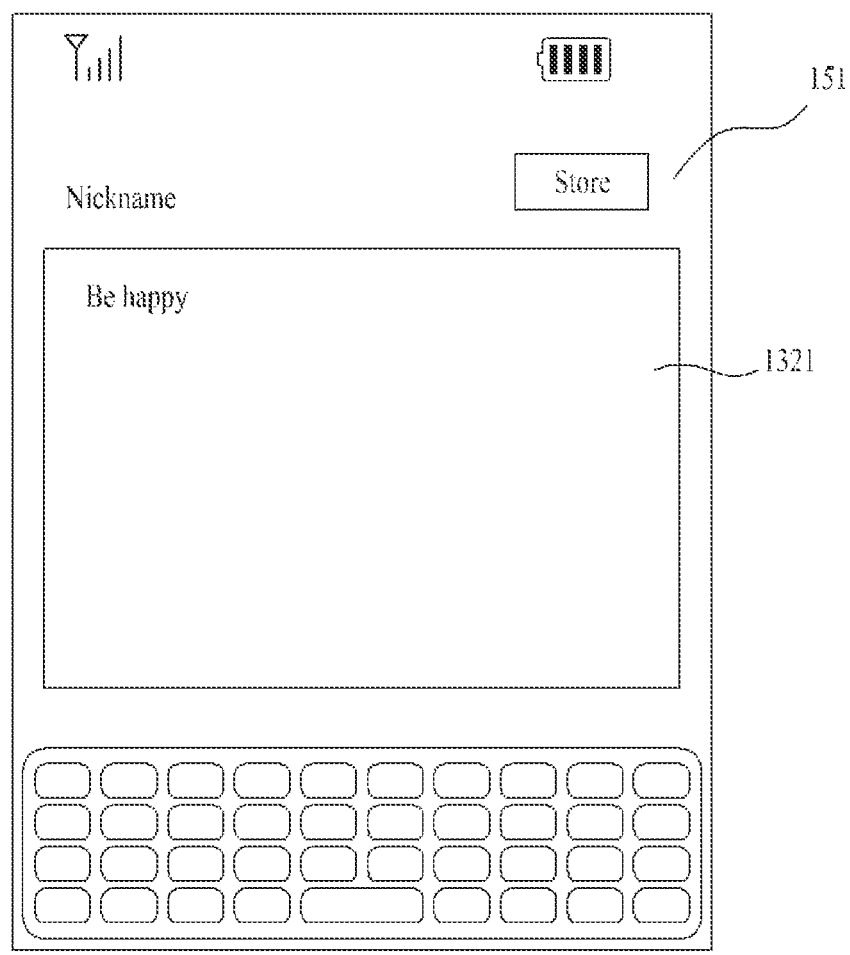
Figure 13E:
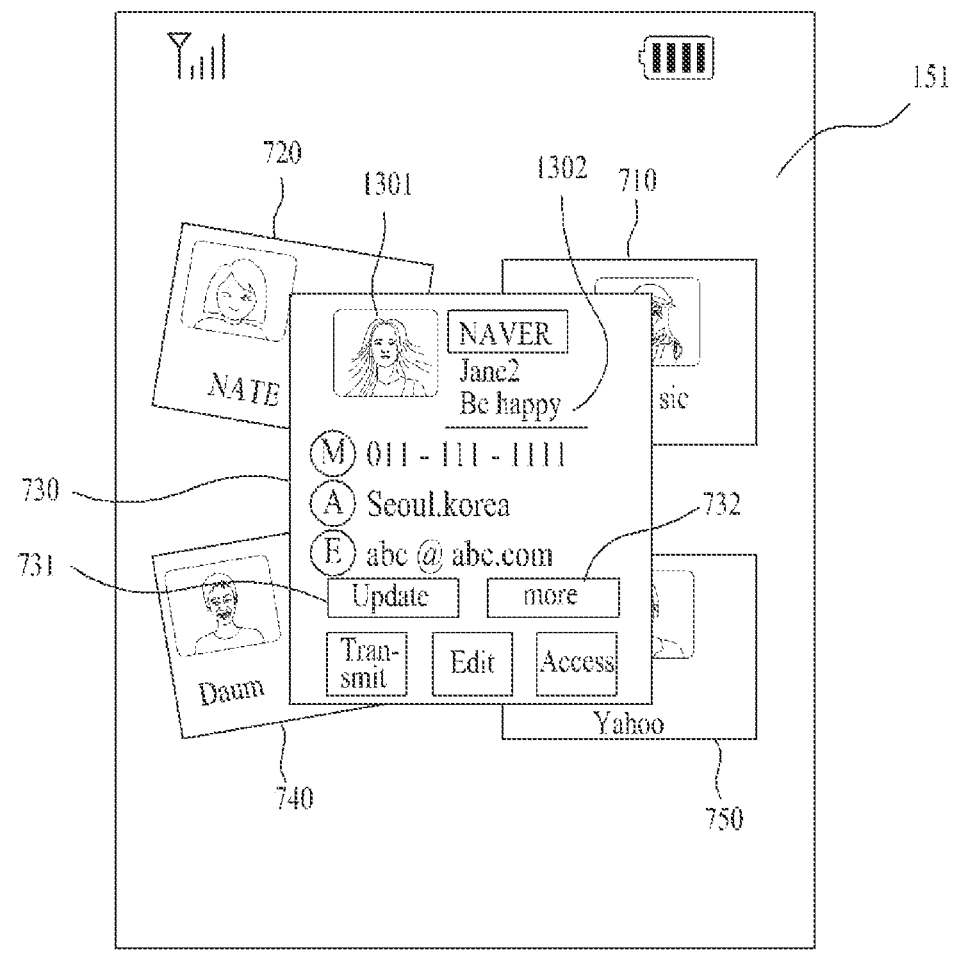

Referring to FIGS. 13B and 13C, if a user image 1301 is touched in FIG. 13A, the mobile terminal 100 displays a photo list, a thumbnail list or text (photo name) list, as illustrated in FIG. 13B, and updates the user image to a photo selected by a user from the displayed photo list, as illustrated in FIG. 13C. Referring to FIGS. 13D and 13E, if a nickname 1302 is touched in FIG. 13A, the mobile terminal 100 displays a nickname input window 1321, as illustrated in FIG. 13D, and updates a previous nickname (Happy day!) to a new nickname (Be happy) input via the nickname input window 1321, as illustrated in FIG. 13E. Information items other than the user image or the nickname maybe edited in the above-described manner.

Figure 14A:
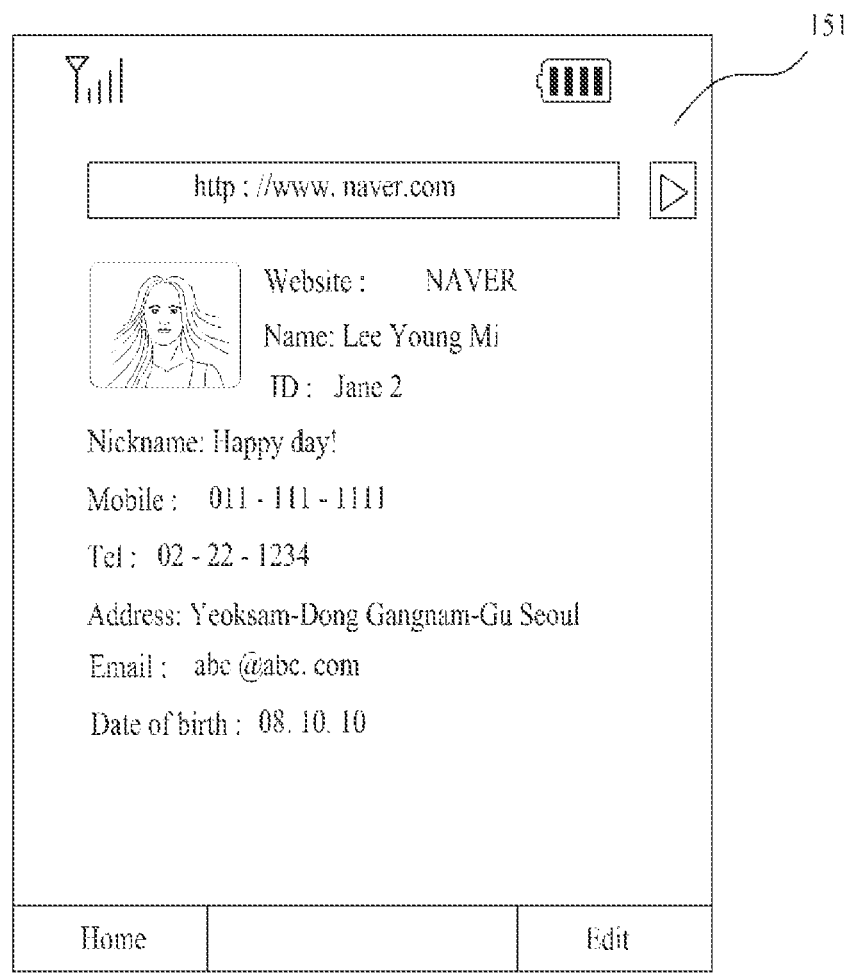
FIGS. 14A and 14B are diagrams of screen configurations when an access command region is selected in FIG. 8.
Figure 14B:
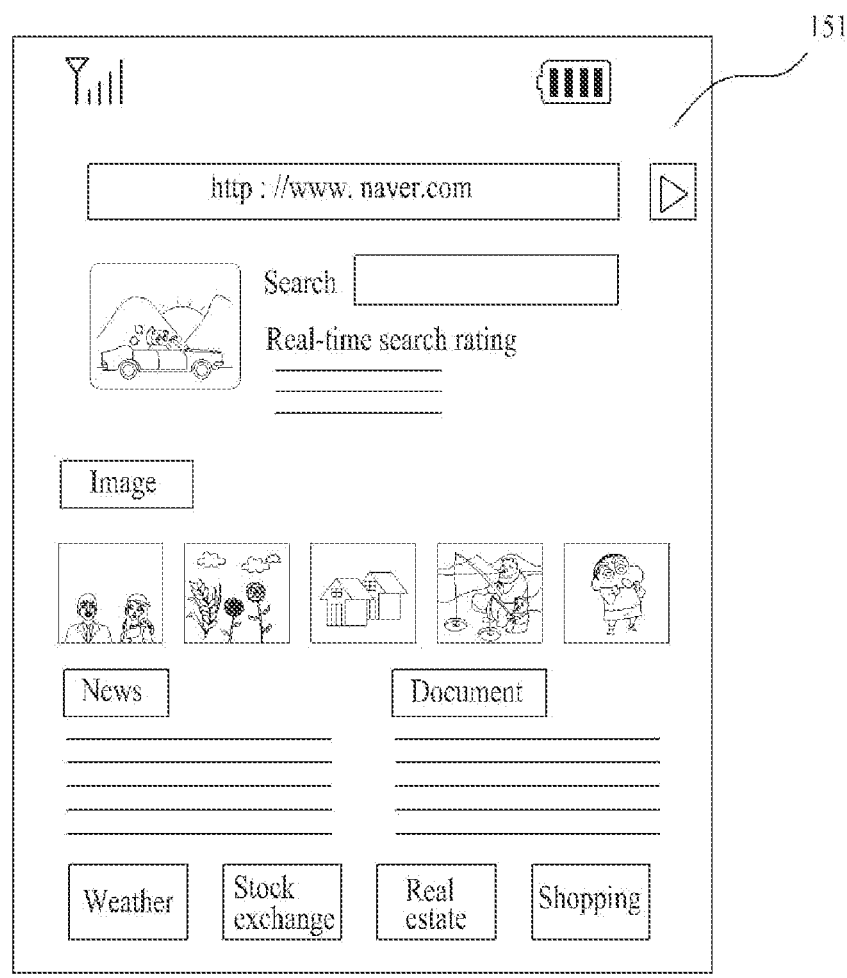

FIGS. 14A and 14B are diagrams of screen configurations displayed when the access region 735 is selected in FIG. 8. Referring to FIGS. 14A and 14B, if the access region 735 is activated according to a user selection in FIG. 8, the mobile terminal 100 accesses a website corresponding to the registration information indicator 730.

Referring to FIG. 14A, a user registration information display image provided by an accessed website can be displayed as an image upon accessing the corresponding website. Referring to FIG. 14B, a representative image of an accessed website can be displayed as an image upon accessing the corresponding website.

Figure 15A:
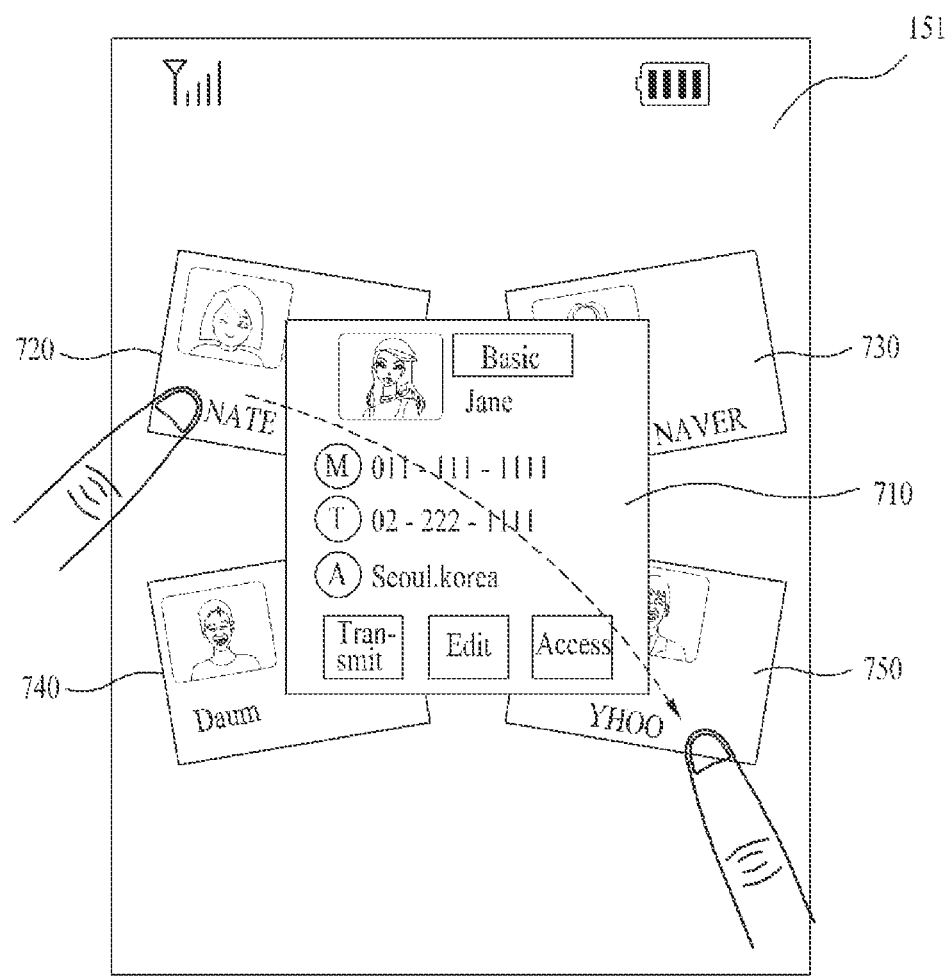
FIGS. 15A and 15B are diagrams of screen configurations for moving positions of a plurality of registration information indicators according to the present invention.
Figure 15B:
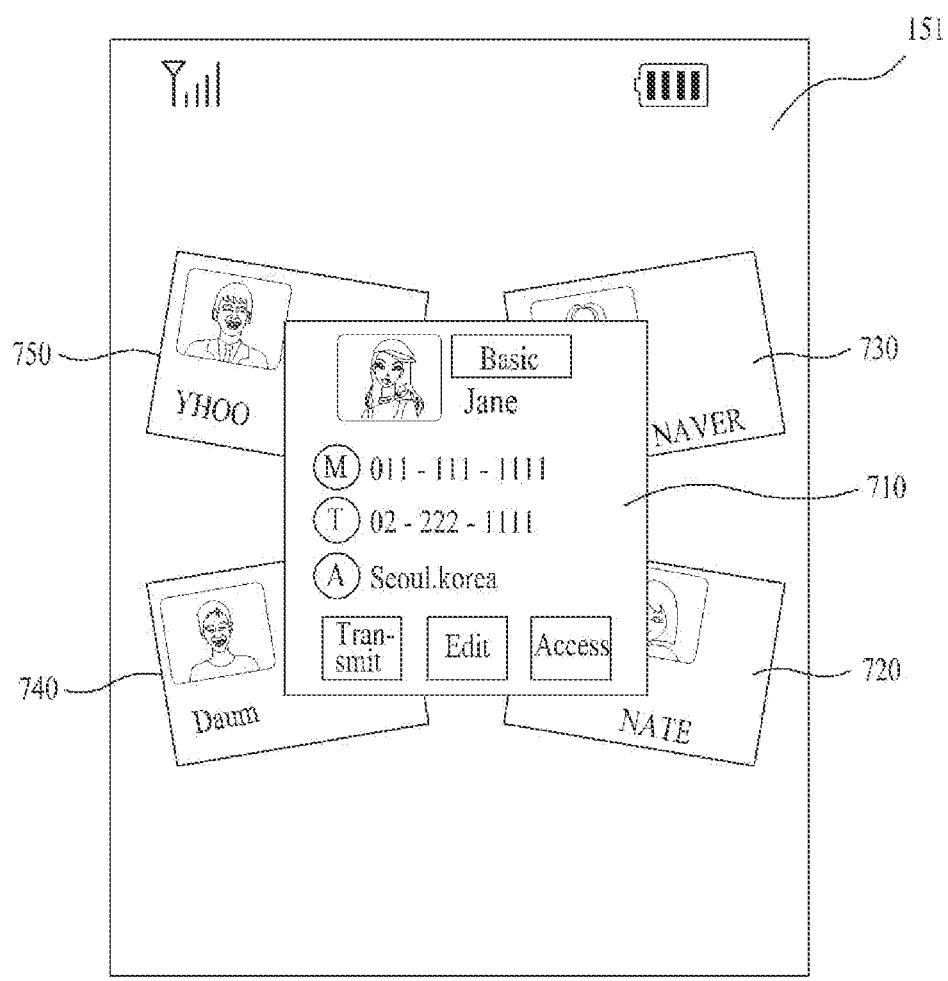

Referring to FIGS. 15A and 15B, the positions among a plurality of registration information indicators displayed on the display 151 may be changed to correspond to a user action input via the user input unit 130 and, specifically, via the touchscreen. When receiving an input of a touch and drag action to a point of a fifth registration information indicator 750 from a point of a second registration information indicator 720, as illustrated in FIG. 15A, the mobile terminal 100 exchanges positions of the second and fifth registration information indicators 720 and 750 with each other, as illustrated in FIG. 15B.

Figure 16A:
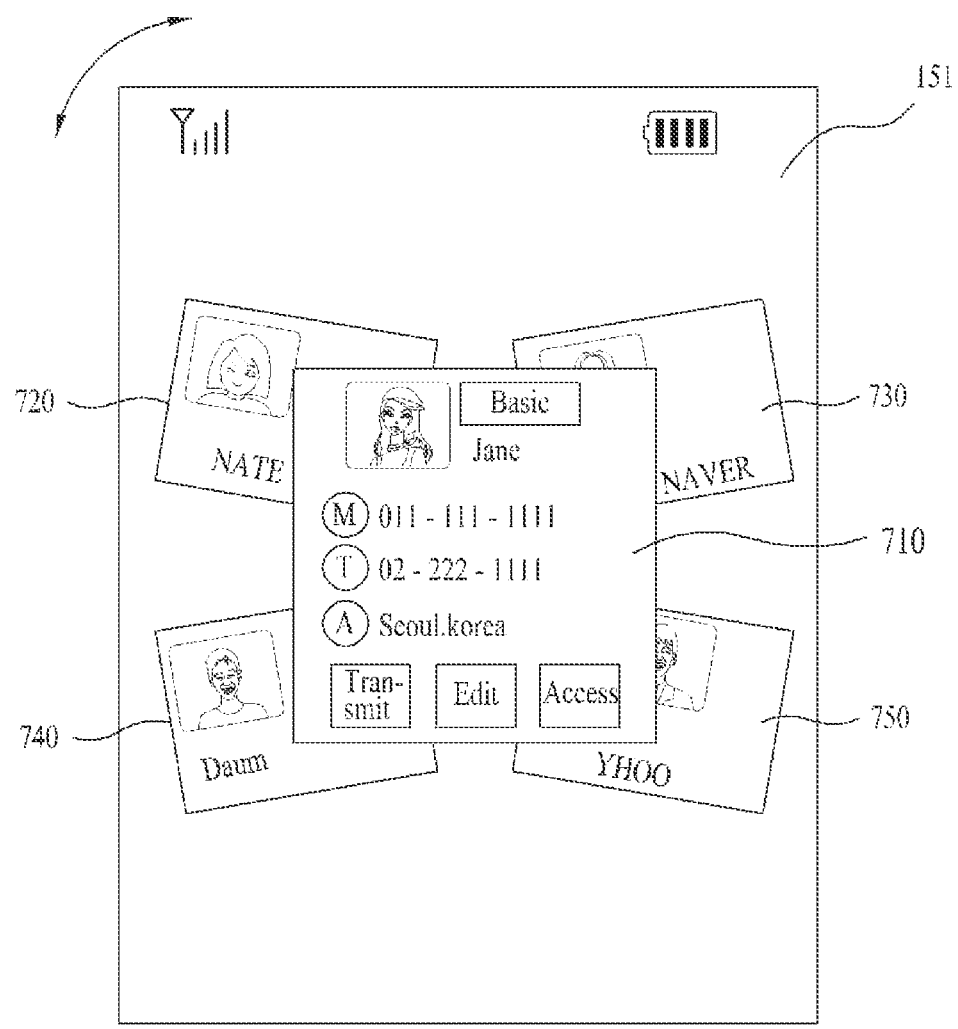
FIGS. 16A to 16C are diagrams of screen configurations for changing registration information indicator arrangement by detecting a terminal motion according to the present invention.
Figure 16B:
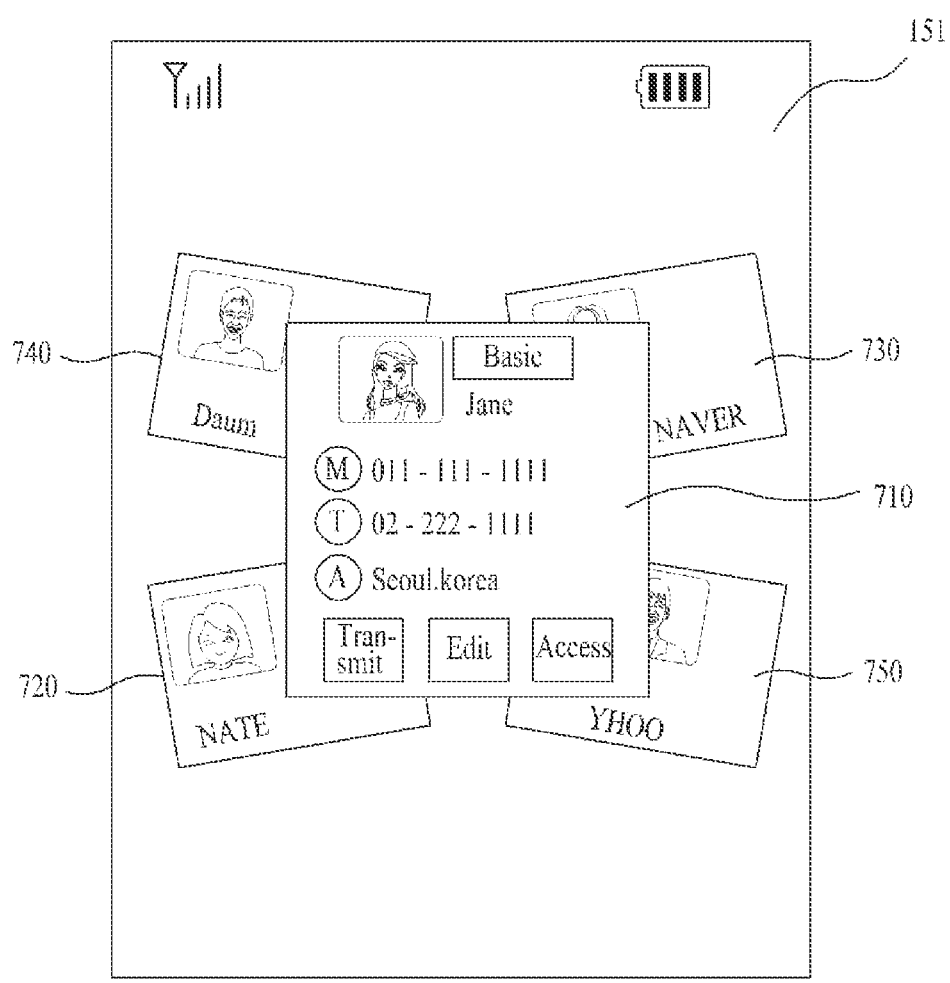
Figure 16C:
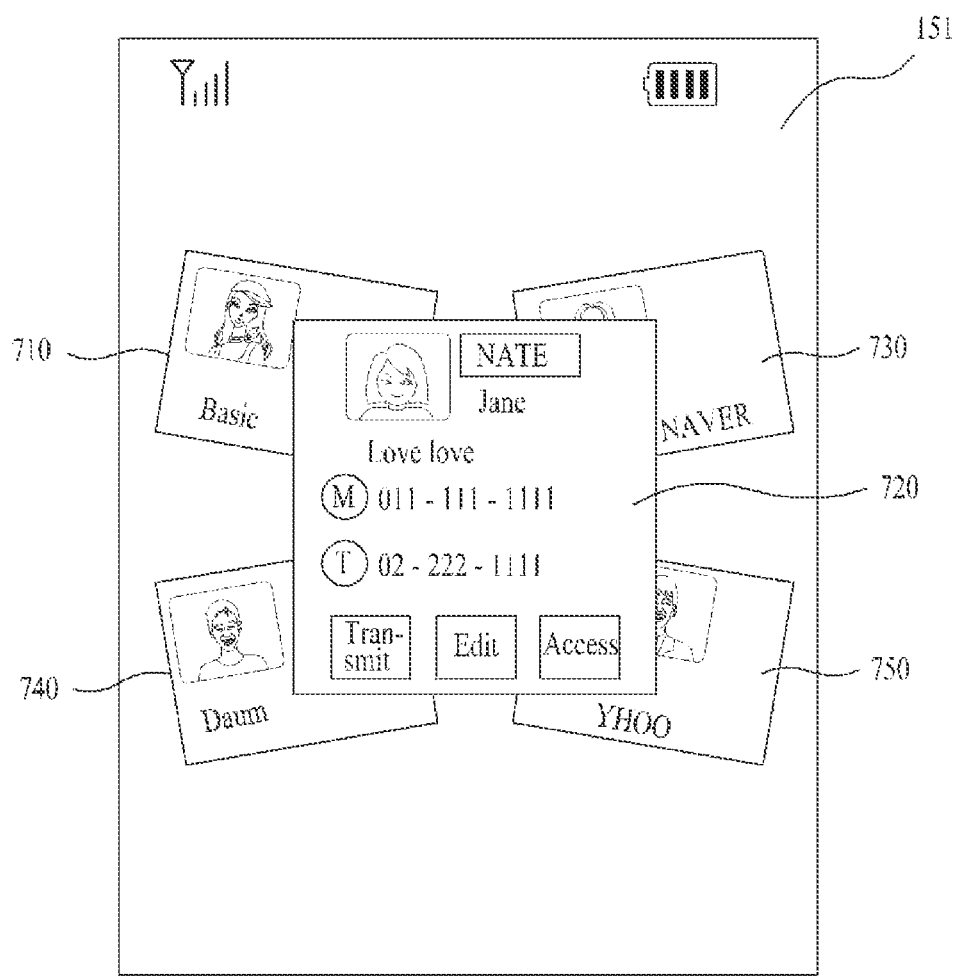

Referring to FIGS. 16A-16C, motion of the mobile terminal 100 can be monitored via the sensing unit 140, specifically a motion detecting sensor, and an arrangement of the plurality of registration information indicators displayed on the display 151 can be changed to correspond to the detected terminal motion, under the control of the controller 180.

When the sensing unit 140 senses a shaking motion of the mobile terminal 100, as illustrated in FIG. 16A, the mobile terminal 100 changes the arrangement of the plurality of registration information indicators, as illustrated in FIGS. 16B and 16C. The mobile terminal 100 can change the arrangement randomly, change the arrangement to move clockwise or counterclockwise, or change to an enlarged registration information indicator, as illustrated in FIG. 16C.

Referring to FIGS. 17A to 17E, the mobile terminal 100 can display correspondent party registration information in the form of a registration information indicator. The correspondent party registration information can include terminal information of a correspondent party terminal or correspondent party information registered at a website by a correspondent party terminal user.

Figure 17A:
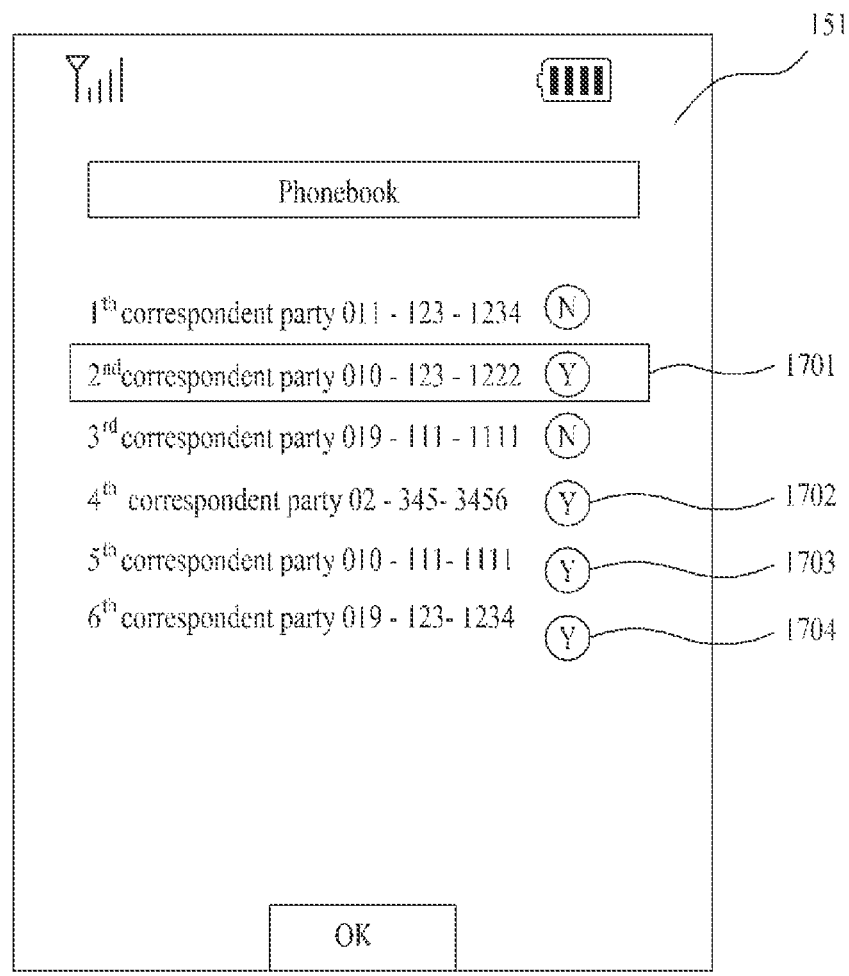
FIGS. 17A to 17E are diagrams of screen configurations for providing correspondent party information according to the present invention.

Referring to FIG. 17A, the mobile terminal 100 can display a correspondent party list including one or more correspondent party terminals registered in a phonebook. The correspondent party list can indicate a correspondent party registration name (e.g., a first correspondent party) registered in the phonebook for each correspondent party terminal, a correspondent party phone number (e.g., 011-123-1234) registered in the phonebook, a correspondent party registration image, and a possibility (N or Y) of displaying correspondent party registration information in a form of a registration information indicator.

Figure 17B:
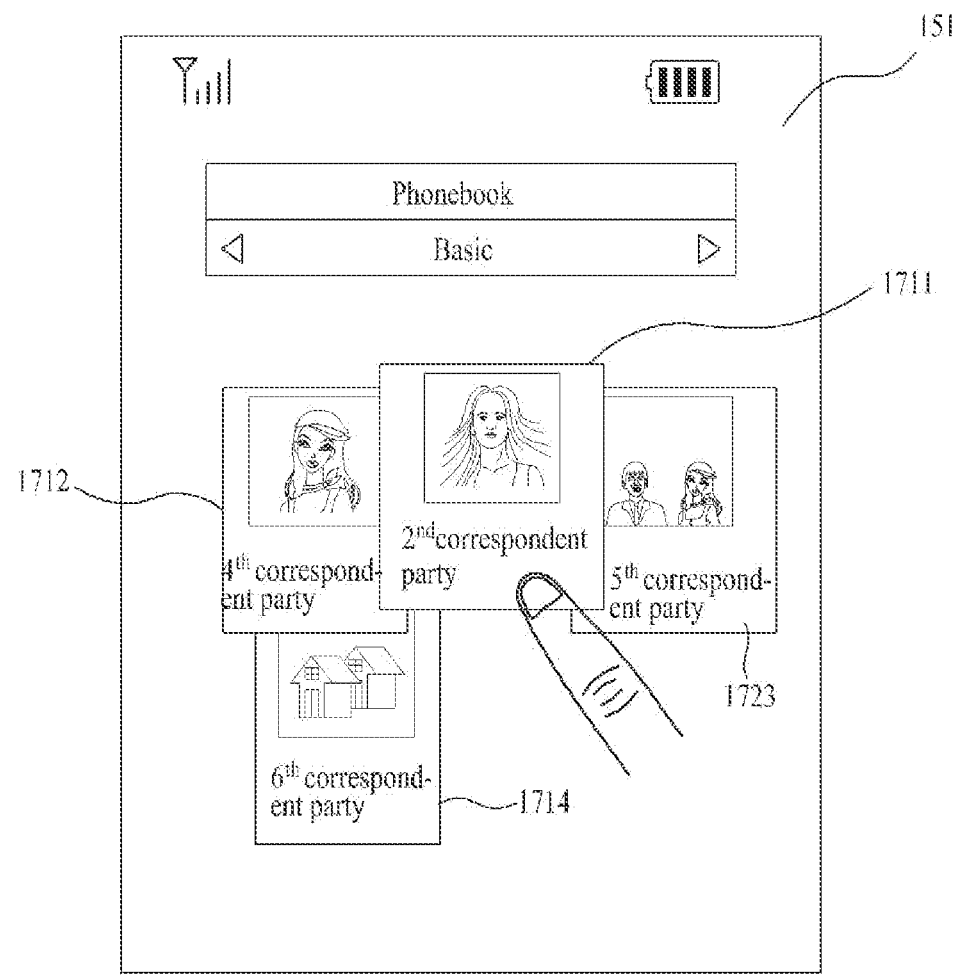
Figure 17C:
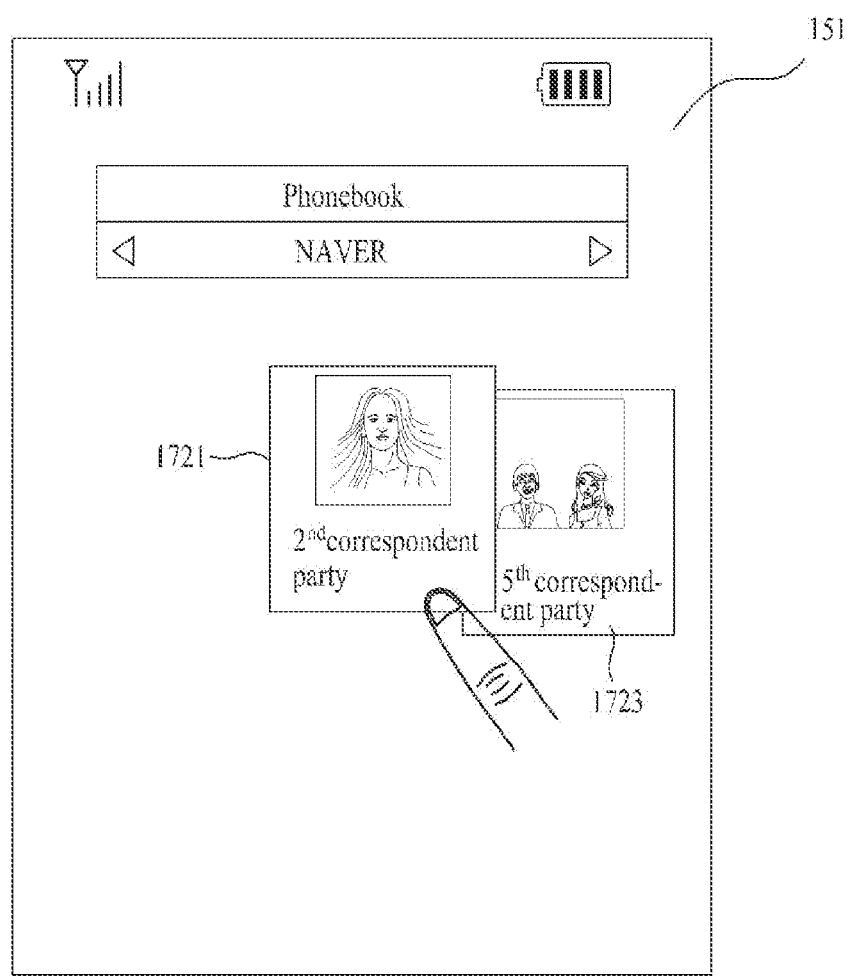

Referring to FIGS. 17B and 17C, the mobile terminal 100 can display a registration information indicator corresponding to each of the one or more correspondent party terminals registered in the phonebook. In particular, the mobile terminal 100 provides terminal information of each of the one or more correspondent terminals, as illustrated in FIG. 17B, or registration information of a correspondent party subscribed for a specific website only, as illustrated in FIG. 17C, according to a registration information type.

Figure 17D:
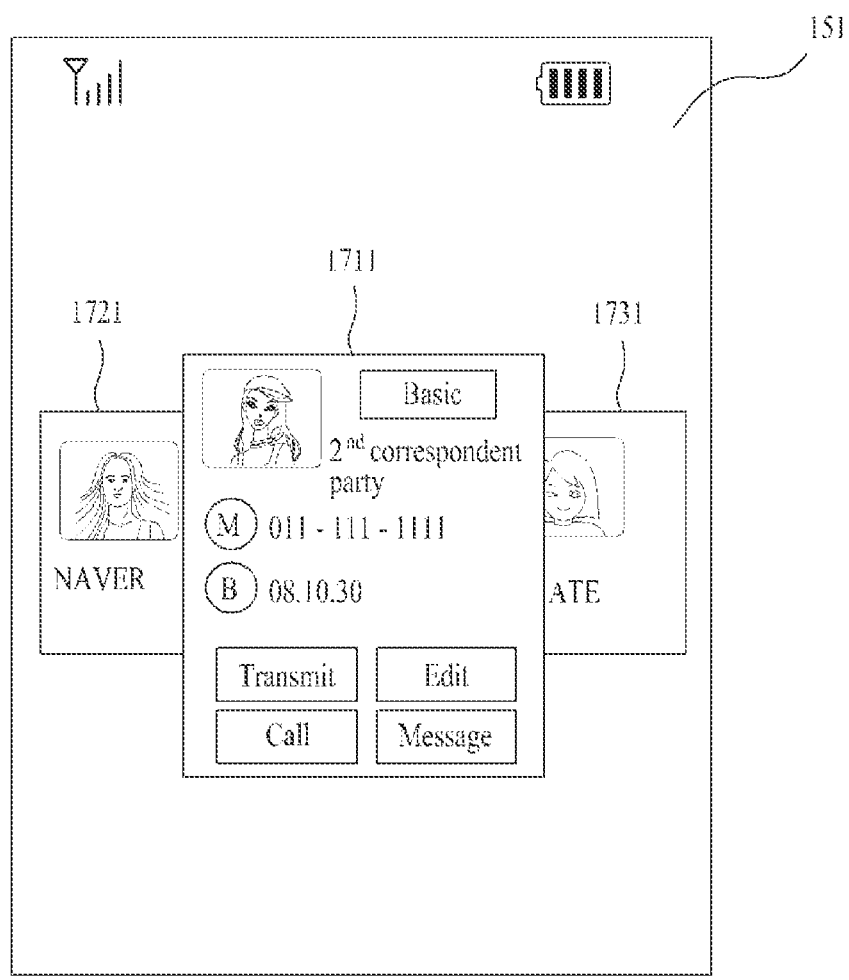
Figure 17E:
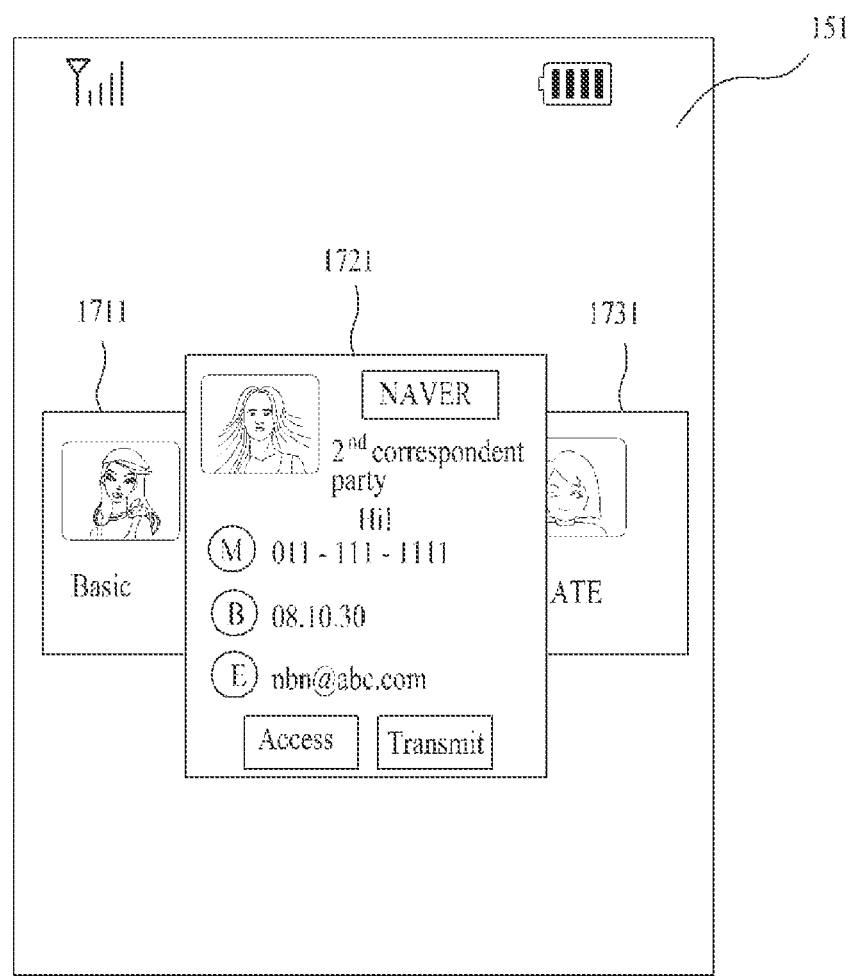

Referring to FIG. 17D, if the second correspondent party 1701/1711 is selected in FIG. 17A/17B, the mobile terminal 100 sets a registration information indicator displaying terminal information of the second correspondent party to a representative registration information indicator and enlarges and displays the registration information indicator. Referring to FIG. 17E, if the second correspondent party 1721 is selected in FIG. 17C, the mobile terminal 100 sets a registration information indicator registered at a website (NAVER) by the second correspondent party to a representative registration information indicator and enlarges and displays the registration information indicator.

The above-described display controlling method can be implemented in a program recorded medium as computer-readable codes. The computer-readable media include all kinds of recording devices in which data readable by a computer system are stored. The computer-readable media includes ROM, RAM, CD-ROM, magnetic tapes, floppy discs, optical data storage devices, to name a few, and also includes carrier-wave type implementations (e.g., transmission via Internet). The above-described mobile terminal and display controlling method thereof can be configured in a manner of selectively combining the embodiments entirely or partially to enable various modifications instead of being limited to the above-described configurations and methods.

Accordingly, the present invention provides the following effects and/or advantages. The present invention displays user registration information corresponding to each of a plurality of registration information indicators on one screen using the same, thereby facilitating the user registration information to be checked. The present invention displays user registration information registered at a website on a terminal using a registration information indicator, thereby enabling the user registration information registered at the website to be checked and edited without directly accessing the corresponding website. The present invention edits user registration information registered at a website within a mobile terminal, thereby solving the inconvenience of directly editing the user registration information via the corresponding website.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for displaying information on a display of a mobile terminal, the method comprising:
    receiving, at the mobile terminal, registration information for each of a plurality of items that are separately associated with a user of a plurality of different users, wherein the registration information, for each of the plurality of items, is received from any of a plurality of different websites, and wherein the registration information, for each of the plurality of items, comprises a user identifier that identifies an associated user, and a user-supplied comment,
    displaying on the display, during a widget display mode, the registration information for each of the plurality of items;
    during the displaying of the registration information for each of the plurality of items, selecting a first item of the plurality of items responsive to a first touch input received at the display, wherein the first item is associated with a first user of the plurality of different users;
    displaying detailed information of the selected first item, wherein the detailed information comprises an entire portion of the user-supplied comment for the first item, and the user identifier for the first item;
    displaying a menu for sending the registration information to a third party in response to input received with regard to the detailed information, wherein the menu comprises a plurality of transmission schemes for sending the registration information associated with the first item;
    displaying a user interface for sending the registration information to the third party, wherein the user interface is for a transmission scheme which was selected from the menu, wherein the interface automatically includes the registration information associated with the first item; and
    sending the registration information associated with the first item in response to user input received with regard to the user interface, wherein the registration information is sent using the transmission scheme selected from the menu.

2. The method of claim 1, wherein in further response to the first touch input, the method further comprises:
    maintaining the displaying of the registration information of the other items of the plurality of items;
    terminating the displaying of the registration information of the first item;
    displaying the detailed information of the first item in an enlarged manner such that a displayed area of the detailed information is greater than a displayed area, prior to the terminating, of the registration information of the first item; and
    displaying the detailed information of the first item at a different location of the display such that the displayed area of the detailed information of the first item is positioned at a location of the display that is different from the displayed area, prior to the terminating, of the registration information of the first item.

3. The method of claim 1, further comprising:
    updating the registration information of one of the plurality of items in response to a second touch input received at the display; and
    displaying on the display updated registration information of the one of the plurality of items.

4. The method of claim 3, wherein the updating of the registration information includes updating the user-supplied comment.

5. The method of claim 1, wherein in response to a second touch input, the method further comprises:
    stopping the displaying of the detailed information of the first item and stopping the displaying of the registration information of the other items of the plurality of items; and
    displaying webpage information of a website identified by website identification of the first item, wherein the webpage information comprises the entire portion of the user-supplied comment, the user identifier, a user-supplied image, website identification, and multiple fields of user-supplied information.

6. The method of claim 1, wherein each item of the plurality of items is a distinct widget having a defined boundary, and wherein the registration information, for each of the plurality of items, is displayed within the defined boundary.

7. The method of claim 1, further comprising:
    displaying an editing interface for editing the user-supplied comment of the registration information of a particular item of the plurality of items; and
    receiving user input via a displayed keypad interface to edit the user-supplied comment.

8. The method of claim 1, wherein the entire portion of the user-supplied comment is not displayed on the display prior to the first touch input being received at the display.

9. The method of claim 1, wherein in further response to the first touch input, the method further comprises:
    terminating the displaying of the registration information of the first item.

10. The method of claim 1, wherein in further response to the first touch input, the method further comprises:
    maintaining the displaying of the registration information of the other items of the plurality of items; and terminating the displaying of the registration information of the first item.

11. A mobile terminal, comprising:
a receiver configured to facilitate communication with a network;
a memory;
a display configured to display information and receive touch input;
a controller configured to cooperate with the receiver and memory and to control the display, the controller being configured to:
receive registration information for each of a plurality of items that are separately associated with a user of a plurality of different users, wherein the registration information, for each of the plurality of items, is received from any of a plurality of different websites, and wherein the registration information, for each of the plurality of items, comprises a user identifier that identifies an associated user, and a user-supplied comment,
cause displaying on the display, during a widget display mode, the registration information for each of the plurality of items;
during the displaying of the registration information for each of the plurality of items, select a first item of the plurality of items responsive to a first touch input received at the display, wherein the first item is associated with a first user of the plurality of different users;
cause displaying on the display of detailed information of the selected first item, wherein the detailed information comprises an entire portion of the user-supplied comment for the first item, and the user identifier for the first item;
cause displaying on the display a menu for sending the registration information to a third party in response to input received with regard to the detailed information, wherein the menu comprises a plurality of transmission schemes for sending the registration information associated with the first item;
cause displaying on the display a user interface for sending the registration information to the third party, wherein the user interface is for a transmission scheme which was selected from the menu, wherein the interface automatically includes the registration information associated with the first item; and
cause sending of the registration information associated with the first item in response to user input received with regard to the user interface, wherein the registration information is sent using the transmission scheme selected from the menu.

12. The mobile terminal of claim 11, wherein in further response to the first touch input, the controller being configured to:
maintain the displaying of the registration information of the other items of the plurality of items;
terminate the displaying of the registration information of the first item;
cause displaying the detailed information of the first item in an enlarged manner such that a displayed area of the detailed information is greater than a displayed area, prior to the terminating, of the registration information of the first item; and
cause displaying the detailed information of the first item at a different location of the display such that the displayed area of the detailed information of the first item is positioned at a location of the display that is different from the displayed area, prior to the terminating, of the registration information of the first item.

13. The mobile terminal of claim 11, the controller being configured to:
update the registration information of one of the plurality of items in response to a second touch input received at the display; and
cause displaying on the display updated registration information of the one of the plurality of items.

14. The mobile terminal of claim 13, wherein the updating of the registration information includes updating the user-supplied comment.

15. The mobile terminal of claim 11, wherein in response to a second touch input, the controller being configured to:
stop the displaying of the detailed information of the first item and stop the displaying of the registration information of the other items of the plurality of items; and
cause displaying on the display webpage information of a website identified by website identification of the first item, wherein the webpage information comprises the entire portion of the user-supplied comment, the user identifier, a user-supplied image, website identification, and multiple fields of user-supplied information.

16. The mobile terminal of claim 11, wherein each item of the plurality of items is a distinct widget having a defined boundary, and wherein the registration information, for each of the plurality of items, is displayed within the defined boundary.

17. The mobile terminal of claim 11, the controller being configured to:
cause displaying on the display an editing interface for editing the user-supplied comment of the registration information of a particular item of the plurality of items; and
detect received user input via a displayed keypad interface to edit the user-supplied comment.

18. The mobile terminal of claim 11, wherein the entire portion of the user-supplied comment is not displayed on the display prior to the first touch input being received at the display.

19. The mobile terminal of claim 11, wherein in further response to the first touch input, the controller being configured to:
terminate the displaying of the registration information of the first item.

20. The mobile terminal of claim 11, wherein in further response to the first touch input, the controller being configured to:
maintain the displaying of the registration information of the other items of the plurality of items; and
terminate the displaying of the registration information of the first item.

* * * * *